(12) United States Patent
Wach

(10) Patent No.: US 6,415,082 B1
(45) Date of Patent: Jul. 2, 2002

(54) OPTICAL NETWORKING ASSEMBLY

(75) Inventor: Michael L. Wach, Atlanta, GA (US)

(73) Assignee: Cirrex Corp., Atlanta, GA (US)

( * ) Notice: Subject to any disclaimer, the term of this patent is extended or adjusted under 35 U.S.C. 154(b) by 0 days.

(21) Appl. No.: 09/526,091

(22) Filed: Mar. 15, 2000

Related U.S. Application Data

(60) Provisional application No. 60/124,424, filed on Mar. 15, 1999.

(51) Int. Cl.[7] .................................................. G02B 6/28
(52) U.S. Cl. .......................... 385/39; 359/128; 385/16; 385/18; 385/24
(58) Field of Search ............................. 385/15–24, 39, 385/47, 48; 359/124, 127, 128

(56) References Cited

U.S. PATENT DOCUMENTS

| 4,693,544 A | 9/1987 | Yamasaki et al. ............. 385/47 |
| 5,521,733 A | 5/1996 | Akiyama et al. ........... 359/127 |
| 5,974,207 A | * 10/1999 | Aksyuk et al. ............... 385/24 |
| 6,219,474 B1 | * 4/2001 | Cai et al. ...................... 385/24 |

FOREIGN PATENT DOCUMENTS

| EP | EP 0 611 097 | 8/1994 |
| JP | JP 10 327128 | 12/1998 |
| WO | WO 97/06616 | 2/1997 |
| WO | WO 99/21316 | 2/1997 |
| WO | WO 00/72416 | 11/2000 |
| WO | WO 00/72491 | 11/2000 |

OTHER PUBLICATIONS

Patent abstracts of Japan vol. 010, No. 080 (P–441), Mar. 29, 1986 & JP 60 217315, Oct. 30, 1985.
Patent abstracts of Japan vol. 012, No. 280 (P–739), Aug. 2, 1988 & JP 63 060410 Mar. 16, 1988.
Patent abstracts of Japan vol. 011, No. 144 (P–574), May 12 1987 & JP 61 282803, Dec. 13, 1986.
Patent abstracts of Japan vol. 014, No. 189 (P–1037), Apr. 17, 1990 & JP 02 034806 Feb. 5, 1990.
Bernacki, B.E., et al., "Alignment–Insensitive Technique for Wideband Tuning of an Unmodified Semiconductor Laser," *Optics Letters, US, Optical Society of America, Washington*, vol. 13, No. 9, (Sep. 1, 1988), pp. 725–727, XP000710590, ISSN: 0146–9579, figure 1.

Clarke, R.H., "Fields in Extended Cavity Lasers," *IEEE Journal of Quantum Electonics, US, IEEE, Inc., New York*, vol. 24, No. 5, (May 1, 1988), pp. 833–842, XP000706012, ISSN: 0018–9197, figure 1.

(List continued on next page.)

Primary Examiner—John D. Lee
(74) Attorney, Agent, or Firm—King & Spalding

(57) ABSTRACT

An optical network assembly includes a planar lightguide circuit (PLC) and a filtering device. A PLC can have at least two optical paths for propagating optical energy. The PLC can be designed to channel optical energy with its optical paths towards the filtering device in order to separate the optical energy into at least two beams, where a first beam can contain a first information channel and a second beam can contain a second information channel. The filtering device can be attached directly to the PLC or it can be attached directly to an optical waveguide that is also connected to the PLC. The optical waveguide can either feed optical energy to or propagate optical energy away from the PLC. Multiple optical waveguides can be attached to a PLC to feed optical energy into and away from the PLC. The PLC, filtering device, and optical waveguide can form the building blocks to more complex optical network architectures.

34 Claims, 13 Drawing Sheets

OTHER PUBLICATIONS

Corzine, S.W., et al., "Actively Mode–Locked Gainasp Laser with Subpicosecond Output, " *Applied Physics Letters, American Institute of Physics, New York, US*, vol. 52, No. 5, (Feb. 1, 1988), pp. 348–350, XP000706598, ISSN: 0003–6951, p. 348, paragraph 3, figure 1.

Heismann F., et al., "Electrooptically Tunable Narrow–Linewidth INGAASP–TI: LINB03 Extended Cavity Laser, " *Optical Fiber Communication Conference (OFC), US, New York, IEEE*, vol. Conf. 10, (Jan. 19, 1987), p. 149, XP000713166, ISBN: 0–936659–41–6, the whole document.

Kahn, J.M., et al., "High–Stability 1.5 $\mu$M External–Cavity Semiconductor Lasers for Phase–Lock Applications, " *IEEE Photonics Technology Letters, US, IEEE Inc. New York*, vol. 1, No. 7, (Jul. 1, 1989), pp. 159–161, XP000053582, ISSN: 1041–1135, the whole document.

Tachikawa Y., et al., "Arrayed–Waveguide Grating Multiplexer with Loop–Back Optical Paths and its Applications," *Journal of Lightwave Technology, IEEE, New York, US*, vol. 14, No. 6, (Jun. 1, 1996), pp. 977–984, XP000598501, ISSN: 0733–8724, abstract, parts II, III, IV and V.A.

International Search Report dated Feb. 19, 2001 for PCT/US 00/14567.

International Search Report dated Oct. 16, 2000 for PCT/US 00/14571.

* cited by examiner

OPTICAL NETWORKING ASSEMBLY

STATEMENT REGARDING RELATED APPLICATIONS

This application is related to U.S. patent application Ser. No. 09/267,258, filed March. 12, 1999 entitled, "Method and Apparatus for Filtering an Optical Fiber", now U.S. Pat. No. 6,222,970, and claims the benefit of priority to U.S. Provisional Application No. 60/124,424 entitled, "Optical Networking Assembly," filed Mar. 15, 1999.

TECHNICAL FIELD

This invention relates generally to the manipulation of light carried by optical fibers. More particularly, the present invention relates to filtering light and propagating reflected light along optical paths of a planar lightguide circuit.

BACKGROUND OF THE INVENTION

In recent years, the use of optical fibers has become increasingly widespread in a variety of applications. Optical fibers have been found to be especially useful for many industries such as telecommunications, computer-based communications, and other like applications.

To maximize efficiency of optical waveguides, multiple information channels can be multiplexed into a single optical beam. In other words, multiple channels of information can propagate along an optical waveguide as a single beam of light energy. In order to form the multiplexed optical signal or to demultiplex the optical signal, optical filters are typically employed to separate light energy of a first wavelength from light energy having different wavelengths. To maximize optical filter efficiency, light energy can be collimated such that rays of light forming an optical beam travel in a manner parallel with one another. Such a collimation of light energy enables individual rays to strike an optical filter at a desired angle. Without collimating light energy, individual rays of light could strike an optical filter at undesirable angles which reduces optical filter efficiency.

For example, in the conventional art as illustrated in FIG. 1, an expanded beam optics system 10 can be used to separate channels of information of a single optical beam 20 that propagates along an optical waveguide 15. Each channel of the single optical beam 20 can have a different wavelength. For example single beam 20 as illustrated in FIG. 1 can include separate information channels that are carried by a first optical beam having a wavelength of lambda sub one ($\Lambda_1$) and a second optical beam having a wavelength of lambda sub two ($\Lambda_2$).

The expanded beam optics system 10 can employ a lens 30 to collimate the beams of optical energy forming the single optical beam 20. The lens 30 is necessary hardware for the conventional system since whenever optical energy leaves one medium and enters into another medium the optical energy refracts or diverges because of the changes in the indices of refraction of the different materials. In addition to the lens 30, the expanded beam optics system 10 also uses free space 40 between an optical filter 50 and the lens 30. The free space 40 may be open space or it may include another medium such as a glass block (not shown).

In FIG. 1, a few of the optical beams 25 that form the single beam 20 are illustrated in order to demonstrate that the individual optical beams 25 are substantially parallel with one another when exiting the lens 30. When the individual optical beams 25 strike the optical filter 50, only optical beams of a predetermined wavelength are permitted to pass through the optical filter 50. In the example illustrated in FIG. 1, the optical filter is designed to pass only optical beams having a wavelength of lambda one ($\Lambda_1$). The individual optical beams 25 having a wavelength of lambda one ($\Lambda_1$) pass through the optical filter 50 and through a glass plate 60 that supports the optical filter 50. The filtered optical beam 70 exits the glass plate 60. The light reflected off of optical filter 50 has optical beams that have wavelengths other than lambda one ($\Lambda_1$), such as lambda two ($\Lambda_2$).

One of the drawbacks of the conventional art is that with such a traditional optics systems 10 larger mechanical configurations are required. In other words, the lens 30 is typically large and bulky relative to the size of the optical waveguide 15. Furthermore, the amount of collimation for light energy with a lens 30 can be directly related to the cross sectional area of the optical beam. Expanded beam optics systems 10 require precision alignment and mounting of the optical devices relative to each other. In other words, the optical waveguide 15 must be in precise alignment with the lens 30 to promote optical efficiency. Similarly, the lens 30 must be in precise optical alignment with the optical filter 50 in order to also promote optical efficiency. Such configurations are not cost efficient for mass production. Additionally, much optical signal loss can occur between the waveguide-lens interface an the lens-free space interface.

Accordingly, a need in the art exists for separating optical energy into separate optical beams of different wavelengths with a higher efficiency. There is a further need in the art for a system for separating optical energy that can optimize the transfer of single mode optical energy propagation between an optical waveguide and a filtering device. An additional need in the art exists for a system that can tolerate a certain amount of misalignment between optical hardware without introducing substantial optical losses. Another need exists in the art for a system separating optical energy that can be easily manufactured and scaleable smaller sizes compared to traditional expanded beam optics that require a substantial amount of hardware. Another need exists in the art for a system for separating optical energy without the use of lenses.

SUMMARY OF THE INVENTION

The present invention solves the problems of expanded beam optics systems by providing an optical network assembly that includes a planar lightguide circuit (PLC) and a filtering device. A PLC can have at least two optical paths for propagating optical energy. The PLC can be designed to channel optical energy to the filtering device in order to separate the optical energy into at least two beams, where a first beam can contain a first information channel and a second beam can contain a second information channel. The filtering device can be attached directly to the PLC or it can be attached directly to an optical waveguide that is also connected to the PLC. This direct attachment can be accomplished by building up the filtering device on the PLC or on the optical waveguide with a thin film deposition process. The optical waveguide can be a flexible optical fiber that is part of a communications network. The optical waveguide can either feed optical energy to or propagate optical energy away from the PLC. Multiple optical waveguides can be attached to a PLC to feed optical energy into and away from the PLC.

Each optical path of a PLC can be made of a transparent core of relatively high refractive index, light-conducting material while the planar material surrounding an optical path can be made of a medium having a lower refractive index. The optical paths can be made of silica, plastic, glass, or low-to-no expansion optical material such as ZERODUR glass. Each of the optical waveguides can be made of materials similar to a PLC. Both the optical waveguides and PLCs can be designed to propagate single modes of optical energy such that the optical energy travels as a single wavefront in order to reduce attenuation and other undesirable effects while increasing bandwidth and transmission properties such as increases in traveled distances.

A PLC or a filtering device (or both) can optimize transfer of single mode optical energy propagation (referred to as modal transfer) between an optical waveguide and the PLC. The PLC and filtering device can be designed to minimize modal disruption (such as changes in E-Field geometry) of optical energy that can occur during the modal transfer of the optical energy between an optical waveguide and the PLC. A PLC can minimize modal disruption that occurs within an interface or junction between the PLC and another light carrying device by facilitating efficient alignment between the PLC and the other light carrying device.

In other words, a PLC's geometry permits rapid and efficient allignment between a PLC and another light carrying device such as an optical waveguide. A PLC in combination with another light carrying device can tolerate a certain amount of misalignment relative to each other without introducing substantial optical losses. This tolerance of misalignment can also increase manufacturability of an optical system that includes a PLC since dimensioning of both a PLC and other light carrying device can be relaxed.

Furthermore, a PLC can permit the use of passive alignment techniques that can reduce time as well as expense compared to conventional active alignment techniques that require signal propagation measurements. That is, with passive alignment, signal propagation testing can be substantially eliminated. Additionally, PLCs can be scaled to smaller sizes compared to traditional expanded beam optics that require additional hardware such as lenses. PLCs can interact with filtering devices without the use of lenses that are typically required in traditional optics to collimate optical energy.

Similar to a PLC, a filtering device in combination with a PLC can optimize the modal transfer between a PLC and another light carrying device. One way to optimize modal transfer between a light carrying device and a PLC is to deposit the filtering device directly on the PLC itself or the light carrying device that can be connected to the PLC. Another way to optimize modal transfer between a light carrying device and a PLC is to reduce a thickness of the filtering device such that optical energy can be transferred to or away from a PLC in the near field. In other words, by reducing the thickness of a filtering device, divergence of optical energy propagating through the filtering device can be reduced or become negligible because the interface between the PLC and light carrying device is substantially small such that optical energy is essentially channeled in a waveguide between the light carrying device and PLC.

Another way to optimize the modal transfer of optical energy between a light carrying device and a PLC is to provide modal adaptations such as changes in geometry in the vicinity of the PLC-light carrying device junction in order to shape the actual mode fields of optical energy. For example, the cross sectional geometry of the either the PLC or light carrying device or both can be adjusted to match each other such that the mode field propagated by the PLC matches the mode field propagated by the light carrying device.

A filtering device can optimize modal transfer between a light carrying device and a PLC by increasing the packing density of the filtering device such that the filtering device approaches a bulk density. In other words, an increased packing density of a filtering device can substantially reduce or eliminate voids within the filtering device that interfere with the propagation of optical energy. Such voids can trap light reflecting or light disturbing materials such as water vapor.

The PLC and filtering device can form building blocks for more complex optical networks or network architectures. In one aspect of the present invention, a PLC and filtering device combination can form a drop or add configuration where one channel of information propagating within a multichannel or multiplexed optical beam can be either dropped from or added to the multichannel or multiplexed beam. In another aspect, the PLC and filtering device combination can form a single channel drop-add configuration where one channel can be dropped from a first multichannel optical beam and then added to a second multichannel optical beam.

In yet another aspect, optical paths within a PLC can be non-linear or curved in order to provide control over an angle of incidence of an optical beam striking the filtering device to minimize obliqueness. The PLC and filtering device combination can form a waveguide-constrained cascade where the PLC can include multiple optical paths that lead to a plurality of filtering devices. Such waveguide-constrained cascades can either multiplex or demultiplex optical energy that propagates through light carrying devices. The PLC and filtering device combination can multiplex separate optical beams having individual channels into a single optical beam or demultiplex a single optical beam into separate optical beams with distinct or different channels.

In another aspect, the PLC and filtering device combination can include multiple mirrors coupled to the PLC that re-direct optical energy onto a plurality of filtering devices. This can refocus optical energy in order to re any optical beam divergence as the optical energy reflects off of a filtering device. Alternatively, the PLC and filtering device combination can form a daisy-chained path waveguide that can optimize positioning or allignment of the optical paths of a PLC with a plurality of filtering devices.

In a further aspect, the PLC and filtering device combination can form a remotely configurable drop-add plus optical cross connect network. The PLC and filtering device combination can further include an activating or diverting element such as a moving mirror that diverts a channel signal out of an optical circuit while introducing a new signal content along the same channel into the optical circuit. This embodiment can function as an optical switch.

For an additional aspect the PLC and filtering device combination form a part of an amplification or gain flattening architecture. Gain flattening elements can be inserted into light paths outside of the PLC and filtering device combination to discretely attenuate channels which in turn flattens the gain of an optical signal over an extended spectral range.

Similar to how the PLC and filtering device combination can form building blocks for optical network architectures, the multiplex, demultiplex, and the optical drop-add inventive concepts can form building blocks for even larger network architectures. These larger network architectures can include a multiplex-demultiplex configuration and an optical drop-add configuration. In a multiplex-demultiplex configuration, multiple beams that each carry a unique information channel can be combined or multiplexed into a single optical beam. This single optical beam can then be propagated along a light carrying device to another PLC and filtering device combination that can then demultiplex the single optical beam into multiple optical beams. In the optical drop-add configuration, multiple channels can be multiplexed into a single optical beam and a few channels can be dropped or added or both at a point between two PLC-filtering device combinations that multiplex and demultiplex the single optical beam.

The PLC and filtering device combination, in addition to the multiplex-demultiplex configuration and optical drop-add configuration, can form an optical cross-connect configuration that permits the sharing of optical channels between at least two separate optical networks. The PLC can be formed with a single segment of optical material suitable for an optical waveguide. A sharp bend of an appropriate angle can be introduced into the single segment of optical material that the PLC and the optical waveguide form an integral unit.

A PLC can be integrated into a bulk matrix. This structure can be formed by utilizing polymer molding techniques such as insert injection molding or by planar waveguide fabrication.

The PLC and filtering device combination can further optimize modal transfer of optical energy by manipulating the shape of the optical paths disposed within a PLC. In other words, an optical path of a PLC can be shaped in such a way as to minimize the divergence of optical energy as the optical energy passes through the filtering device. An optical path within a PLC can be tapered so that optical energy is projected optimally through the filtering device and into a fiber core of an optical waveguide. The shaping of optical paths within a PLC can reduce losses that can occur when optical energy propagates through the filtering device.

The PLC and filtering device combination can be part of mounting structures that facilitate the precise alignment of light carrying devices such as optical waveguides with each PLC and filtering device. These mounting structures can include blocks comprising cavities having a shape similar to a respective PLC. Other mounting structures can include V-groove based assemblies that are designed to align optical waveguides by supporting the outer cladding of optical waveguides with a respective V-groove. The V-grooves can be made at appropriate angles relative to one another as dictated by the number of optical wage guides to be coupled and the type of PLC and filtering device being employed.

That the present invention improves over the drawbacks of the conventional art and accomplishes the objects of the invention will become apparent from the detailed description of the illustrative embodiments to follow.

DETAILED DESCRIPTION OF EXEMPLARY EMBODIMENTS

Figure 1:
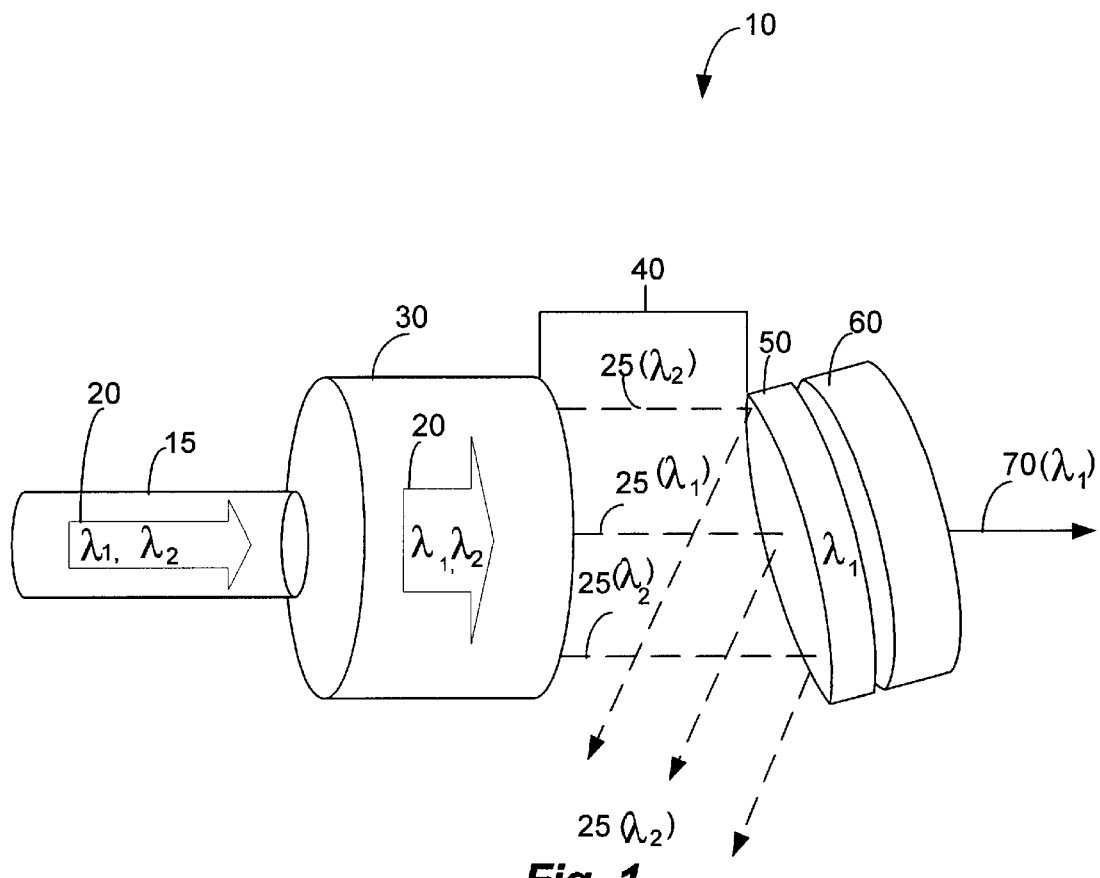
FIG. 1 illustrates an expanded beam optics system of the conventional art for the separation of optical energy into optical beams of different wavelengths.

To understand the operation and design of planar lightguide circuits (PLCs), a review of fiber optics in general can be beneficial to the reading audience. The term "optical fiber" is used herein to refer generally to any optical waveguide or structure having the ability to transmit the flow of radiant energy along a path parallel to its axis and to contain the energy within or adjacent to its surface. "Step index," "gradient index," and "single mode" fibers are subcategories within the optical fiber designation. The term "multimode" optical fiber refers to an optical waveguide that will allow more than one bound mode to propagate.

Step index fibers include a transparent cylindrical core of relatively high refractive index light-conducting material. Typical core materials include silica, plastic, and glass. The core is cylindrically surrounded by a medium having a lower refractive index. Typically, this medium is a relatively thin cladding, which is an intimately bound layer surrounding the core. The cladding may be a different material than the core, or it may be a similar material that has been doped in order educe its refractive index. The core may also be unclad whereby the ambient medium, often air, is of lower refractive index and acts in the capacity of the cladding. The cladding is usually surrounded by one or more coatings, buffers, and/or jackets that primarily serve protective roles.

An arbitrarily oriented ray within the core of a step index fiber travels until it intersects the core boundary at the cladding and interacts in accordance with its angle of incidence. Generally, rays angularly oriented close to parallel with the fibers axis are efficiently reflected at the core boundary. Within certain angular limitations, the ray is oriented to undergo total internal reflection at the core interface. These angular limitations are a function of the refractive indices of the core and the cladding. The limits determine the angular bounds within which the fiber can propagate light. Thus, sustained propagation occurs via repeated total internal reflection within the fiber core. If the arbitrary ray is oriented beyond the fiber's limits for total internal reflection, then only a fraction of its intensity is internally reflected. The reduced intensity ray is further attenuated as it undergoes subsequent core boundary interactions. The ratio of light energy that is internally reflected to the energy that escapes varies according to the angle. If the ray is oriented normal to the core boundary, then all of its intensity is lost. As the angle of an improperly oriented ray approaches the acceptance limits for total internal reflection, the relative intensity of the reflected ray increases. Thus, for rays with angle orientation close to, but outside of, the limits for total internal reflection, multiple reflections can occur prior to significant power loss.

If the arbitrarily oriented ray within the fiber core has sufficient power and orientation, then it sustains power and eventually reaches the fiber end face. It interacts with the end face boundary in accordance with the laws of reflection and refraction. As the ray crosses the end face boundary between the fiber's core and the surrounding medium, it is refracted. The refractive effect is a function of the refractive index of the core, the refractive index of the surrounding medium, and the orientation of the ray relative to the fiber end face surface. The factor of ray orientation is based upon its angle relative to a surface normal taken at the point where the ray intersects with the end face surface boundary. Angular orientation of rays outside the fiber end face and propagating rays within the fiber core are distinctly correlated. A correlation exists between individual and collective external and internal rays.

The previous discussion centered on rays internally propagating and exiting the fiber. An analogous situation exists for rays outside the optical fiber entering into the fiber core. The correlating development is readily drawn by those skilled in the art. For a fiber utilized for single-direction flow of light, light is typically injected into the fiber at one end and exits the fiber at the opposite end. However, fibers can also be utilized in a bidirectional configuration. In this configuration, light purposely enters and exits from a single end of the fiber.

As light propagates within the fiber core, it tends to become mixed or randomly oriented over distance. Even highly directional sources, such as lasers, become mixed or scrambled over distance following input into a long optical fiber. In this mixing process, the fiber's modes are filled and all source characteristics, or so-called launch conditions, are lost. The mixing process can be accomplished in shorter fibers by tightly coiling the fiber, inducing micro-bends, or otherwise stressing the fiber. Similarly, for very short fiber lengths, launch characteristics are retained. Also, for very short lengths of fiber, light can be transmitted beyond the normal limits for propagation dictated by the angular limits for total internal reflection. This property is due to the reduced number of reflections, which accumulate minimal attenuation. A fiber's ability to sustain transmission beyond the normal limits for total internal reflection can be enhanced by the application of internally reflective coatings applied to the fiber's outer cylindrical surface. This coating can be applied to either the fiber's core or the cladding. It should be noted that, for long fibers, propagation cannot be totally reliant on reflective coatings. In contrast to total internal reflection, even the best reflective coatings offer less than 100 percent reflectivity. Losses associated with repeated reflections at less than 100 percent efficiency quickly accumulate resulting in severe attenuation. Vast numbers of reflections occur during propagation in even moderate fiber lengths.

While the above discussion provides some technical insight for many types of optical fibers and optical waveguides in general, a preferred exemplary embodiment of the present invention is designed to propagate single mode optical energy. To propagate single mode optical energy, the core diameter of the PLCs and any associated optical fibers must be sufficiently small so that the optical energy will travel as a single wavefront having a mode field slightly larger than the core. That is, single mode optical devices can be made with the materials discussed above, however, these optical devices are scaled or sized to support single mode optical energy propagation.

Figure 2:
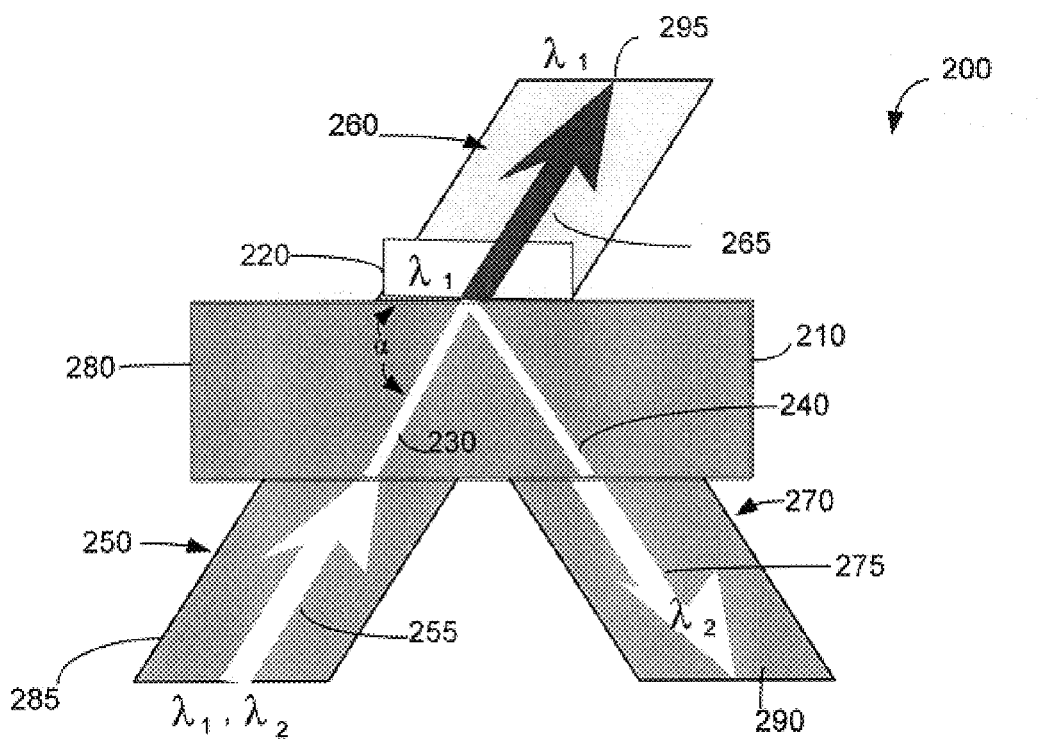
FIG. 2 is a diagram that illustrates a single-channel drop or add configuration according to an exemplary embodiment of the present invention.

FIG. 2 illustrates an exemplary optical network assembly 200 that includes a planar lightguide circuit (PLC) 210 and a filtering device 220. The exemplary PLC 210 illustrated in FIG. 2 can include a first optical path 230 and a second optical path 240. The first optical path 230 can be connected to a first optical waveguide 250 that has a first optical core 255. The filtering device 220 and the first optical path 230 can be connected to a second optical waveguide 260 that has a second core 265. The second optical path 240 can be connected to a third optical waveguide 270 that has a third core 275.

It is noted that the cores 255, 265, and 275 of the first, second, and third optical waveguides, respectively, each have arrow heads to designate the direction of flow of optical energy. In the actual physical embodiments of these waveguides, the optical cores are shaped similarly to the optical paths 230, 240 of the PLC 210.

Each optical path 230, and 240 of the PLC as well as the cores 255, 265 and 275 of the optical waveguides, can be made of a transparent material that has a relatively high index of refraction. The material 280, 285, 290, and 295 surrounding the optical paths 230, 240 and cores 255, 265, and 275 can be made of a medium having a lower index of refraction relative to the cores and optical paths. This surrounding material may be different than that of the optical paths and cores or it may be a similar material wherein a dopant is introduced to alter its refractive index. Alternatively, a dopant can be introduced to either the core or optical path of a PLC or both in order to alter the refractive index of the core or path or both relative to the surrounding material. The optical paths and cores can be made of silica, plastic, high quality optical glass such as BK-7, or low-to-no expansion optical material such as ZERODUR glass.

PLC fabrication processes include ion exchange, flame hydrolysis, and reactive ion etching. The waveguide can be imposed onto a substrate by depositing or growing a high index film on the substrate surface or by diffusing a dopant into the substrate surface. Etching and/or photolithographic techniques can be used to cast the optical paths within a PLC into desired circuit patterns.

Both optical waveguides 255, 265, and 275 and the optical paths of the PLC 210 can be designed to propagate single modes of optical energy so that the optical energy travels as a single wave front in order to substantially reduce attenuation while substantially increasing band width and transmission distances. The PLC 210 can optimize the transfer of single mode optical energy propagation (referred to as modal transfer) between the optical waveguides 250, 260, and 270 and the PLC 210 itself.

The PLC 210 can minimize the modal disruption of optical energy that can occur during the transfer of the optical energy between the optical waveguides 250, 260, 270, and the PLC 210. The PLC 210 can minimize modal disruption by facilitating efficient alignment between the PLC 210 and the optical waveguides 250, 260, and 270. In other words, the PLC's geometry permits rapid and efficient alignment between the PLC 210 and the optical waveguides 250, 260, and 270. The PLC 210 can tolerate a certain amount of misalignment with the optical waveguides 250, 260, and 270 without introducing any substantial optical losses. This tolerance of misalignment can translate into increased manufacturability of an optical system that includes the PLC 210 since dimensioning of the PLC 210 or light carrying device or both can be relaxed. An optical system can include the PLC 210 in combination with light carrying devices such as one or more optical fibers.

Furthermore, a system including the PLC 210 can permit the use of passive alignment techniques that can reduce time as well as expense for assembly of the system itself compared to conventional active alignment techniques that require signal propagation measurements. Additionally, the PLC 210 can be scaled to much smaller sizes compared to traditional expanded beam optics systems that require additional hardware such as lenses. The PLC 210 can interact with the filtering device 220 without the use of lenses.

Similar to the PLC 210, the filtering device 220 in combination with the PLC 210 can optimize the modal transfer between the PLC 210 and the second optical waveguide 260. One way to optimize modal transfer between the PLC 210 and optical waveguide 260 is to deposit the filtering device 220 directly on the PLC 210 itself or by depositing the filtering device 220 directly on the end of the second optical waveguide 260. Another way to optimize modal transfer between the PLC 210 and the second optical waveguide 260 is to substantially reduce the thickness of the filtering device 220 such that optical energy can be transferred to or from the PLC 210 in the near field. In other words, by substantially reducing the thickness of the filtering device 220, divergence of the optical energy propagating through the filtering device 220 can be substantially reduced or become negligible. The interface between the light carrying device and PLC 210 can be made substantially small such that optical energy is directed in a waveguide effectively formed between the PLC 210 and the light carrying device, such as second waveguide device 260.

The filtering device 220 can further optimize the modal transfer between the PLC 210 and second optical waveguide 260 by increasing the packing density of the filtering device 220 such that the filtering device 220 approaches a bulk density. In other words, increasing packing density of the filtering device can substantially reduce or eliminate voids within the filtering device 220 that interfere with the propagation of optical energy. Such voids can sometimes trap light reflecting or light disturbing materials, such as water vapor, that can interfere with optical energy propagation. The filtering device 220 can be a dielectric, thin-film interference filter of alternating refractive index layers.

The filtering device 220 can have a packing density in excess of 90 percent. In other exemplary embodiments, the packing density for the filtering device 220 can be above 95 percent In further exemplary embodiments, the packing density can be above 99 percent. In an exemplary embodiment, the filtering device can include refractory oxides. The filtering device 220 can also be a band pass filter covering at least one channel.

However, the filtering device in other embodiments can also be a high-pass, low-pass, or a band stop filter. The filtering device 220 can also be a rugate filter. The operating wavelength of the filtering device 220 can be a variety of wavelengths, including 830 nanometers, 1310 nanometers, and 1550 nanometer windows. The slope of the filtering device 220 relative to corresponding optical paths 230 and 240 can be steep. In some exemplary embodiments, the filtering device 220 can be capable of differentiating between channels spaced less than two nanometers apart. In another exemplary embodiment, the filtering device can have a transmission greater than 90 percent at a first wavelength channel and blocking at least 25 decibels (dB) down at adjacent channels spaced 1.8 nanometers away and at least 35 decibels at non-adjacent channels. Alternatively, the filtering device can also be a tunable filter.

The PLC 210 and filtering device 220 combination can separate optical energy having at least two channels of information propagating at different wavelengths lambda one ($\Lambda_1$) and lambda two ($\Lambda_2$). The PLC 210 and filtering device 220 combination can separate the optical energy propagating in the first optical waveguide 250 into its discreet component beams that have wavelengths of lambda one ($\Lambda_1$) and lambda two ($\Lambda_2$). The PLC 210 and optical filtering device 220 separate the optical energy by receiving the optical energy from the first optical waveguide 250 and propagating the optical energy along the first optical path 230 of the PLC 210. The first optical path 210 can propagate the optical energy towards the filtering device 220 that has an operating wavelength of lambda one ($\Lambda_1$). The filtering device 220 can be disposed at an angle alpha relative to the first optical path 230 such that all the optical energy having a wavelength of lambda one ($\Lambda_1$) will flow through the optical filtering device 220 into the second optical waveguide 260. The remaining optical energy having a wavelength other than lambda one ($\Lambda_1$), such as a wavelength lambda two ($\Lambda_2$), can then be reflected away from the optical filtering device 220 along the second optical path 240 of the PLC 210. The optical energy propagating along the second optical path 240 can then be carried further away by the third optical waveguide 270.

It is noted that the thickness of the optical filtering device 220 as illustrated in FIG. 2 has been exaggerated for illustration purposes only. In an actual physical embodiment, the optical filtering device 220 can be much thinner and dispose substantially within the second optical waveguide 260 or attached directly to a side of the PLC such that its thickness is negligible compared to the planar surface of the PLC 210.

The PLC 210 can have a substantially rectangular shape as illustrated in FIG. 2. However, other shapes are not beyond the scope of the present invention. The PLC 210 can have two optical paths 230 and 240 as illustrated in FIG. 2. However, the number and orientation of optical paths are not limited to those shown in FIG. 2. The number of optical paths may be increased or decreased depending upon the application of the PLC 210. In an exemplary embodiment, the PLC 210 can be designed to couple to one or more single mode fibers. With the PLC 210, the separation between the PLC 210 and the optical waveguides 250, 260, and 270 can be minimized so as to minimize power loss and signal degradation associated with optical beam divergence. The PLC 210 further minimizes the obliqueness of light incident on the filtering device 220 so as to maximize the filtering device performance.

The PLC 210 can be designed such that the longitudinal axis of the cores 255, 265, and 275 of the optical waveguides are substantially aligned with the longitudinal axis of the respective optical axes of the first and second optical paths 230, 240. This design overcomes the long-standing challenge with optical structures incorporating single mode fibers where only a small percentage of the fiber end-face has active optical energy.

The direction of optical energy flowing through the optical waveguides 250, 260, and 270 and the PLC 210 in filtering device 220 is not limited to the direction illustrated in FIG. 2. The direction of the optical energy can be reversed with respect to the arrows illustrated in FIG. 2 such that "add" configuration can be made. In other words, instead of dropping a channel propagating along an optical beam having a wavelength of lambda one ($\Lambda_1$), optical energy having wavelengths other than lambda one ($\Lambda_1$) can be added to a stream of optical energy (as will be discussed below with respect to FIG. 3). The PLC 210 and optical filtering device 220 are well suited for optical network technology. Such technology includes, but is not limited to, telecommunications, community antenna television (CATV) applications, computer networking, and other similar types of applications.

Figure 3:
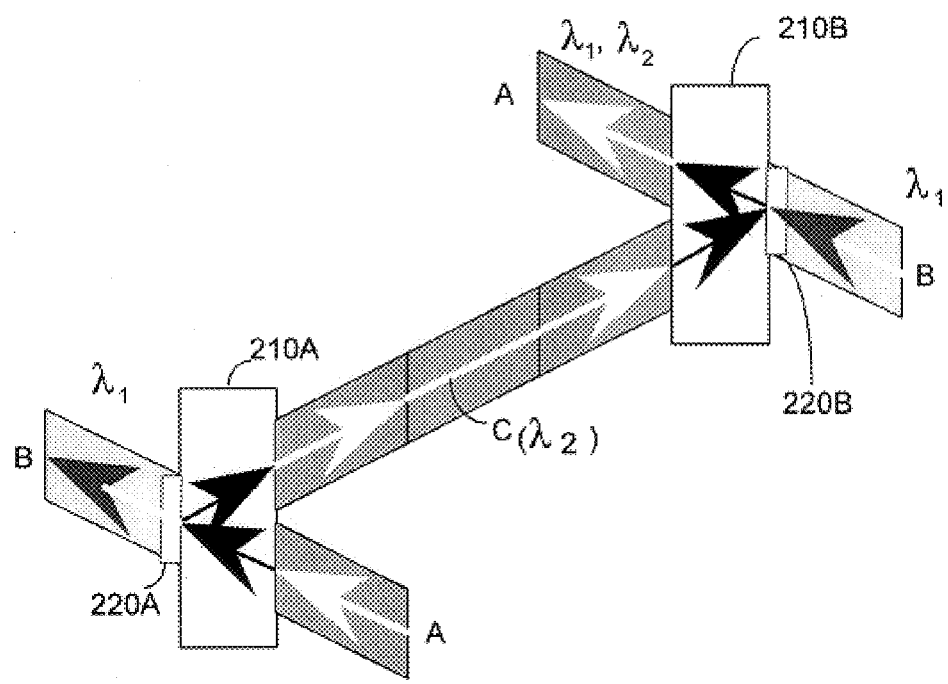
FIG. 3 is a diagram that illustrates a single-channel drop-add configuration according to an alternate exemplary embodiment of the present invention.

FIG. 3 illustrates a single-channel drop-add configuration in which two PLC-optical filtering device combinations are used to drop a channel propagating upon an optical beam having a wavelength of lambda one ($\Lambda_1$) while adding optical energy having wavelengths other than lambda one ($\Lambda_1$) to an optical beam having a wavelength of lambda one ($\Lambda_1$). In other words, the configuration illustrated in FIG. 3 has two spectrally compatible band-pass filtering devices 220A and 220B that are physically opposing one another. The filtering devices may operate either on a single channel or a group of channels. The filtering devices 220A and 220B can also be constructed as high-pass or low-pass type filters. While dropping and adding the same channel is depicted, the drop and add channels can be unique. It is noted that the angular geometry of the light paths and end-faces of the PLC 210A and 210B are such that the end-faces of the PLC 210 and 210B can be within two parallel planes. The opposing optical waveguides can then be disposed in a parallel manner. The angle of light incident onto a filtering device end-face can equal the angle of reflected light.

In the exemplary embodiment set forth in FIG. 3, optical energy A has optical beams having wavelengths of lambda one ($\Lambda_1$) and lambda two ($\Lambda_2$) that enter into PLC 210A. The filtering device 220A operates at a wavelength of lambda one ($\Lambda_1$) such that an optical beam B having a wavelength of lambda one ($\Lambda_1$) can pass through the filtering device 220A. The remaining optical energy C having an optical beam with a wavelength of lambda two ($\Lambda_2$) can be carried away by an optical waveguide toward a PLC 210B. An optical beam B with a wavelength of lambda one ($\Lambda_1$) is fed into the filtering device 220B such that the optical beam B passes through the optical filtering device 220B that operates at a wavelength of lambda one ($\Lambda_1$). Optical energy C having a wavelength of lambda two ($\Lambda_2$) is reflected off of the optical filtering device 220B and combines with the optical beam B. The optical beam C and the optical beam B can combine to form optical energy A having wavelengths lambda one ($\Lambda_1$) and lambda two ($\Lambda_2$). While optical energy A exiting filtering device 210B and optical energy B entering filtering device 220B can have the same wavelengths as optical energy A and B entering and exiting filtering device 220A, the information content modulated on these respective optical beams can be different relative to each other. That is, information content modulated on optical energy A at optical filtering device 220A can be different then information content modulated on optical energy A at optical filtering device 220B. Alternatively, as apparent to those of ordinary skill in the art, information content at both optical filtering devices can be the same. This information modulation concept is also applicable to the remaining exemplary embodiments of the present invention.

Figure 4:
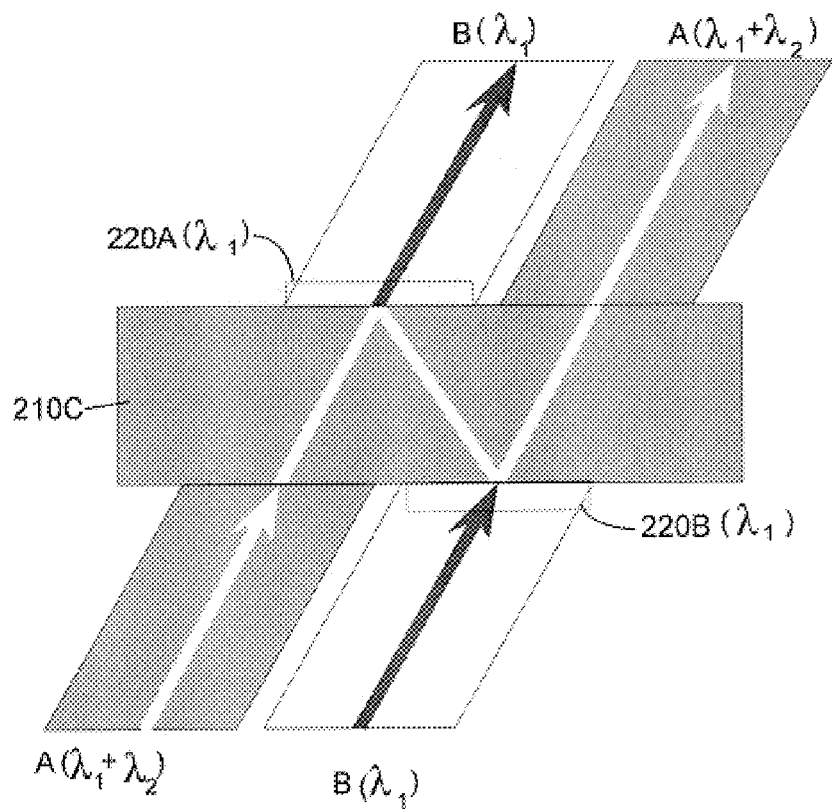
FIG. 4 is a digram that illustrates a straight-line path single-channel drop-add configuration according to an alternate exemplary embodiment of the present invention.

FIG. 4 illustrates another exemplary embodiment of a single-channel drop-add configuration where the PLC 210C can form a cascade structure in which multiple reflections take place within the PLC 210C between multiple filtering devices 220A and 220B. This exemplary embodiment can be referred to as a straight-line path PLC configuration because the optical paths of the PLC 210C can track the optical energy's path as it zigzags between filtering devices 220A and 220B. The resulting functionality of the embodiment illustrated in FIG. 4 is similar to that illustrated in FIG. 3. However, the PLC 210C illustrated in FIG. 4 can have at least three optical paths that interact with at least two optical filtering devices 220A and 220B. Confining optical energy within the optical paths of the PLC 210C maintains intensity of the optical channels that are manipulated, and asserts control over modal patterns as well as preserving optical pulse quality.

Figure 5:
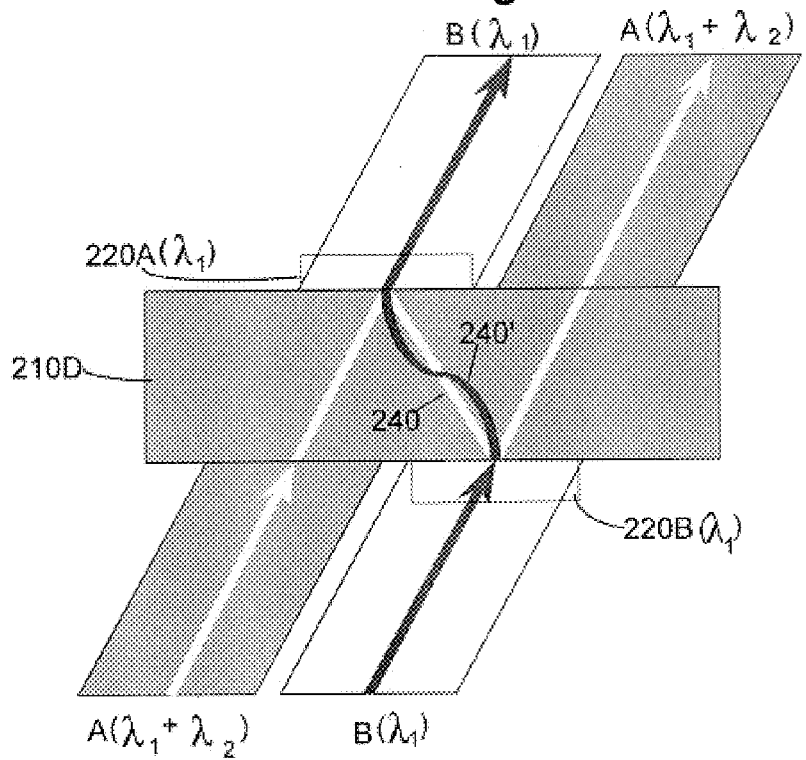
FIG. 5 is a diagram that illustrates a serpentine path single-channel drop-add configuration according to an alternate exemplary embodiment of the present invention.

FIG. 5 illustrates another alternate exemplary embodiment of a single-channel drop-add configuration. However, in this alternate exemplary embodiment, the second optical path 240' of the PLC 210D can have a serpentine configuration such that control over the angle of incidence with respect to optical energy impinging on the filtering devices 220A and 220B can be controlled to minimize obliqueness. This, in turn, increases optimal performance of the optical filtering devices 220A and 220B. Although the second optical path 240 is also illustrated in the exemplary PLC 210D, it will be appreciated that the optical path 240 would not be present within the PLC 210D in an actual physical embodiment.

Figure 6:
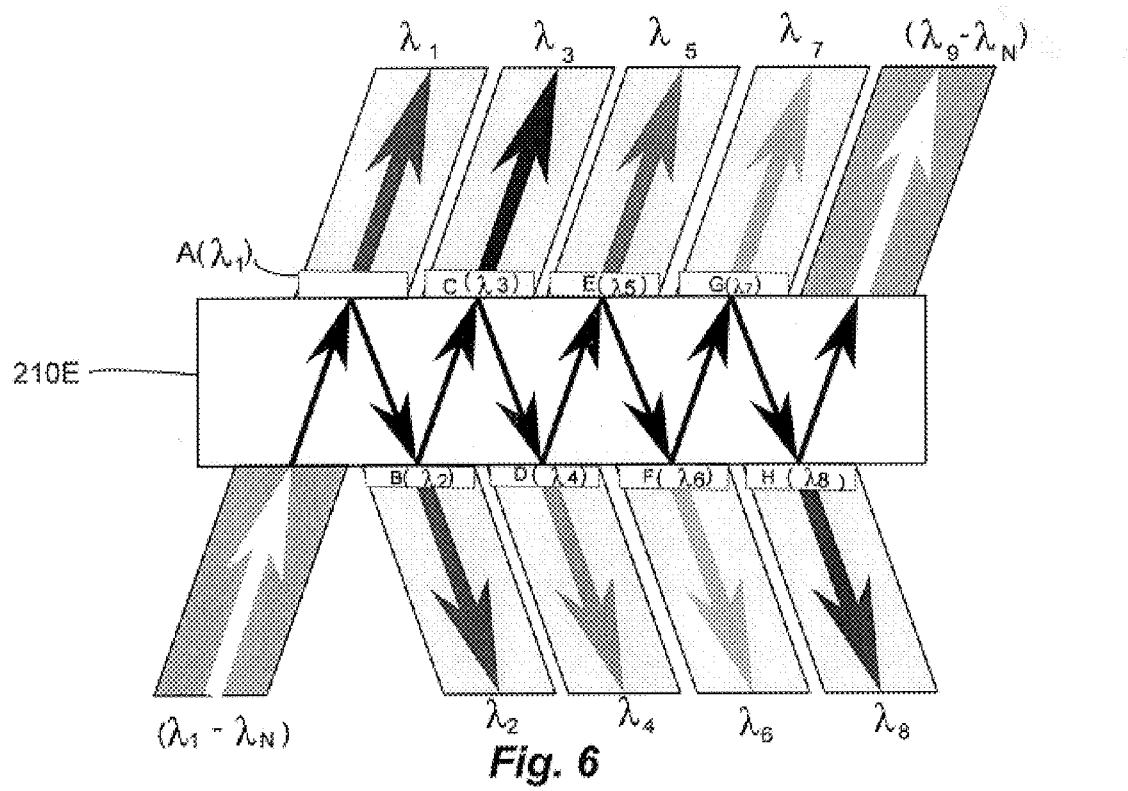
FIG. 6 is a diagram that illustrates an eight-channel demultiplex or multiplex configuration according to an alternate exemplary embodiment of the present invention.

FIG. 6 illustrates another alternate exemplary embodiment that includes an eight-channel demultiplex or multiplex configuration. In this alternate exemplary embodiment, optical energy having wavelengths lambda one ($\Lambda_1$) through lambda N ($\Lambda_N$) is fed into a PLC 210E. The optical filtering devices A–H filter out or drop their respective channels. After the optical energy is cascaded through the PLC 210E, the remaining optical energy, comprising wavelengths of lambda nine ($\Lambda_9$) to lambda N ($\Lambda_N$), can then be fed away from the PLC 210E. Although the embodiment illustrated in FIG. 6 support a demultiplexing architecture, a multiplexing function can be achieved by reversing the input and output of light energy relative to the PLC 210E.

Figure 7:
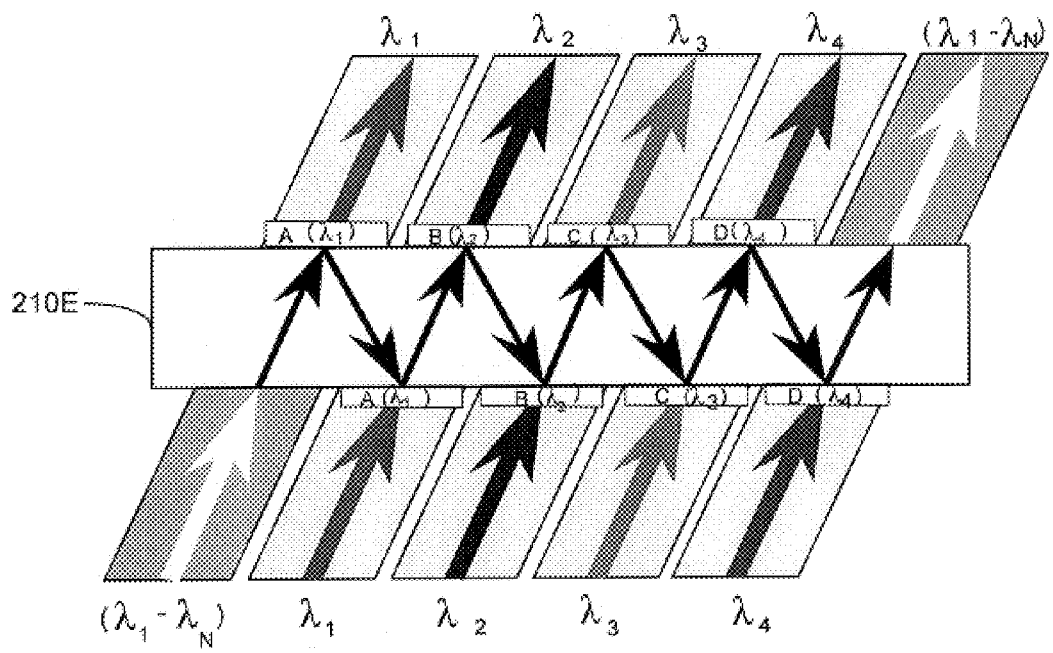
FIG. 7 is a diagram that illustrates a four-channel drop-add configuration according to an alternate exemplary embodiment of the present invention.

FIG. 7 illustrates a further alternate exemplary embodiment that can provide a four-channel drop-add configuration. In this exemplary embodiment, optical energy having wavelengths of lambda one ($\Lambda_1$) through lambda N ($\Lambda_N$) can be introduced into PLC 210E. Channels having wavelengths lambda one ($\Lambda_1$) through lambda four ($\Lambda_4$) are dropped and then reintroduced into the PLC 210E. In other words, as respective information channels having wavelengths lambda one ($\Lambda_1$) through lambda four ($\Lambda_4$) are dropped, different signals that may operate upon the same wavelengths can be reintroduced into the PLC 210E. Therefore, optical energy having wavelengths lambda one ($\Lambda_1$) through lambda N ($\Lambda_N$) can be introduced into the PLC 210E and can exit the PLC 210E. However, it is noted that the information content of the optical energy having wavelengths lambda one ($\Lambda_1$) through lambda N ($\Lambda_N$) entering into the PLC 210E can be different than the optical energy having wavelengths lambda one ($\Lambda_1$) through lambda N ($\Lambda_N$) exiting the PLC 210E.

Figure 8:
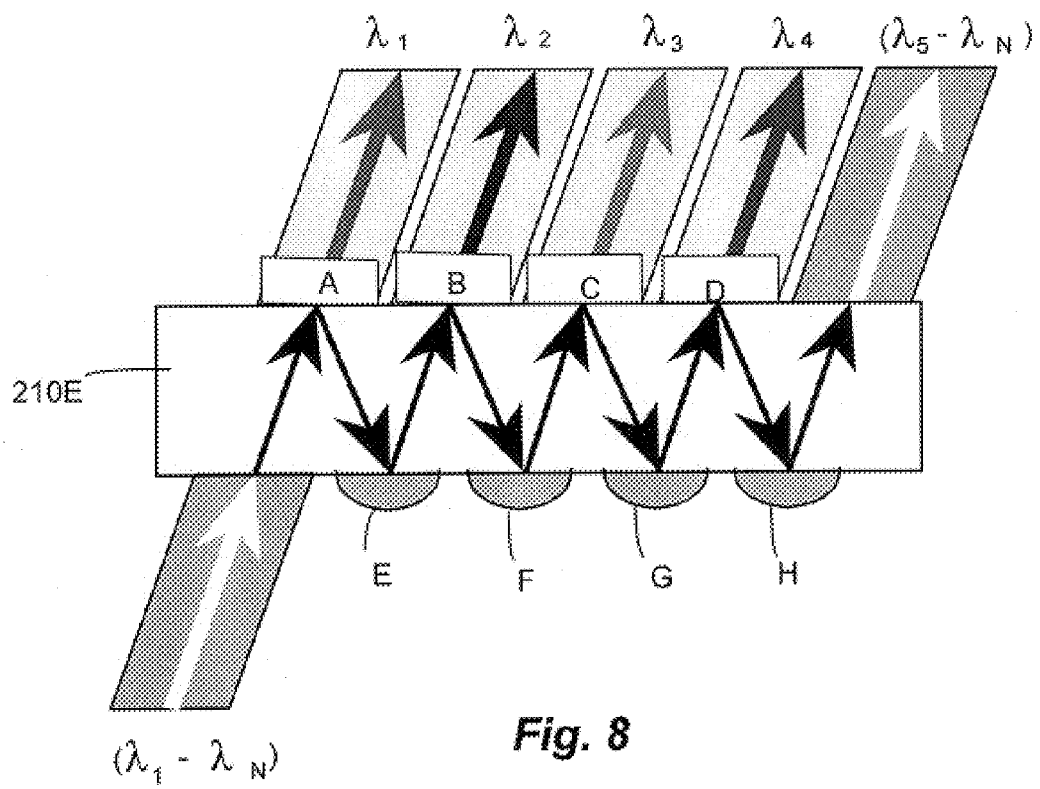
FIG. 8 is a diagram that illustrates a four-channel drop configuration that employs concave mirrors according to an alternate exemplary embodiment of the present invention.

FIG. 8 illustrates another alternate exemplary embodiment where the PLC 210E is designed to drop four channels having wavelengths of lambda one ($\Lambda_1$) through lambda four ($\Lambda_4$). The optical energy is cascaded through the PLC 210E by a plurality of optical filtering devices A through D and focusing reflective elements E–H, which that can include concave mirrors.

Each mirror can correct for or reset beam divergence along the cascade path within the PLC 210E and substantially reducing any need for collimation. Fabrication of the PLC 210E and focusing reflective elements E–H can be achieved by molding or a micro-machining materials, such as low-to-no expansion glass and optical polymers positioned within the optical cascade path. As optical energy reflects off a respective optical filtering device A–D, it can diverge or spread out relative to its original path. The concave mirrors E–H can substantially correct for this divergence by refocusing the optical energy to the next optical filtering device within the cascade.

Figure 9:
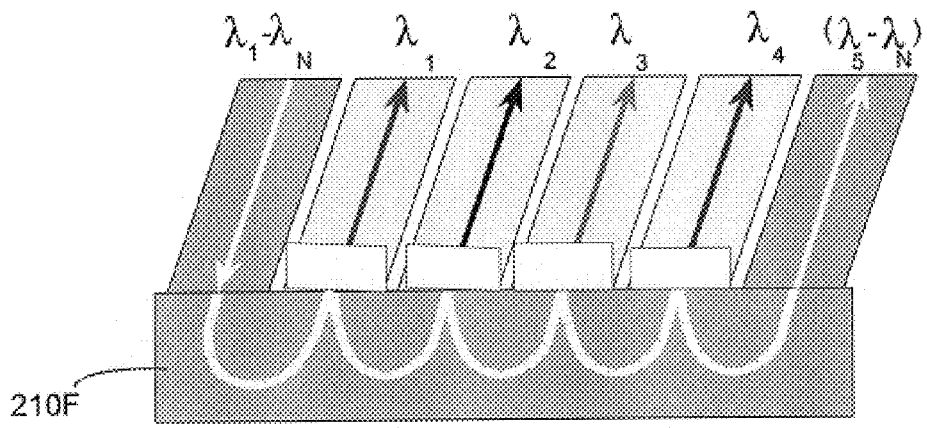
FIG. 9 is a diagram that illustrates a daisy chained path configuration according to an alternate exemplary embodiment of the present invention.

FIG. 9 illustrates an additional alternate exemplary embodiment of the present invention in which the PLC 210F includes a daisy-chained path construction. Each optical path within the PLC 210F is curved to provide additional control over the angle of incidence onto a respective optical filtering device to minimize obliqueness. In this embodiment, optical channels propagating with wavelengths of lambda one ($\Lambda_1$) through lambda four ($\Lambda_4$) can be dropped from the optical energy having wavelengths of lambda one ($\Lambda_1$) through lambda N ($\Lambda_N$)

Figure 10:
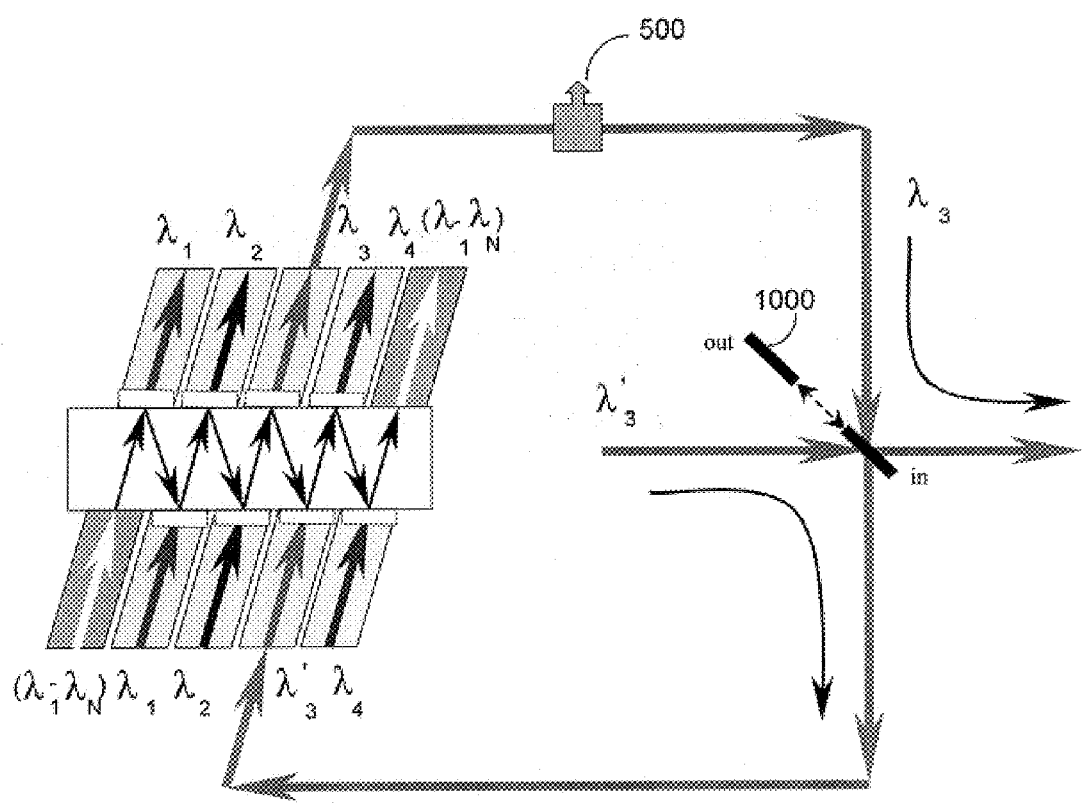
FIG. 10 is a diagram that illustrates a dynamically and remotely configurable drop-add plus optical cross-connect format configuration according to an alternate exemplary embodiment of the present invention.

FIG. 10 illustrates a dynamically and remotely configurable drop-add plus optical cross-connect configuration. In the drop leg, lambda three ($\Lambda_3$) of a channel can be fed back into the add leg as lambda three ($\Lambda'_3$). The resulting loop not only bypasses the drop-add function but also provides a way to introduce dynamic configuration capabilities and extended functionality. As illustrated, a diverting element 1000, such as a double-sided mirror, can divert a channel's signal content such as lambda three ($\Lambda_3$), out of the optical circuit and introduce new signal content, represented by lambda three ($\Lambda'_3$), back into the optical circuit. If the diverting element 1000 is inserted at a point common to the branches of the two optical circuits, then the diverting device 1000 can operate as a configurable optical cross-connect.

Signals from the first circuit can be diverted to the second circuit. Likewise, signals from the second circuit can be diverted into the first optical circuit. Activation of the diverting element 1000 can be controlled by transmitting configuration commands with primary optically encoded information across an optical circuit. In this manner, information packets and accompanying drop locations can be transmitted across the optical network. One way to send this optical configuration information is to dedicate a channel to this function. A second way can be to tap off a fraction of the signal at a potential drop location. The signal may be sampled at pre-determined times without constant drain on network power.

Alternatively, a small portion of the optical power can be continually monitored. While a beam splitter can be used, less intrusive devices are available to monitor the optical signals. For example, commercial monitors are also available to externally access a fiber's active versus dark power status. However, such monitors lack the ability to read normally encoded, high-speed messages. By transmitting address headers that contain device configuration instructions under a distinct encoding regime, detection power threshold can be reduced.

Further, a header can be transmitted at a significantly slower light pulsing rate or distributed between several spectral channels. An optical circuit can include an optional monitor port having a beam splitter or similar component to tap off a portion of the light intensity for dynamic monitoring. Upon the recognition of signal patterns, the diverting device 1000 can be activated in response to the detection of recognized signal patterns by the monitoring port 500.

Figure 11:
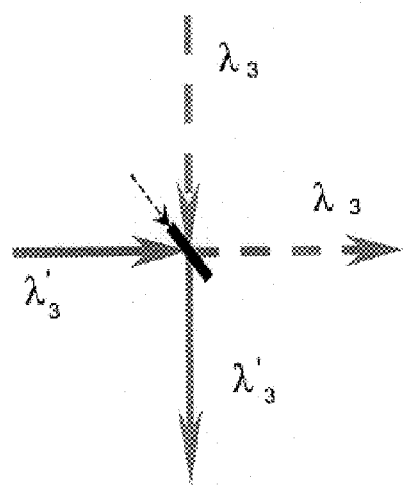
FIG. 11 is a diagram that illustrates an element in an optical path such that existing optical channel content of a light circuit can be diverted while new channel content can be introduced to the light circuit in accordance with the embodiment illustrated in FIG. 10.

FIG. 11 illustrates the diverting element 1000 within the optical path of a light circuit. In accordance with this illustration, existing channel content operating at a wavelength lambda three ($\Lambda'_3$), can be diverted while new channel content operating at lambda three ($\Lambda_3$)' can be introduced into the light circuit.

Figure 12:
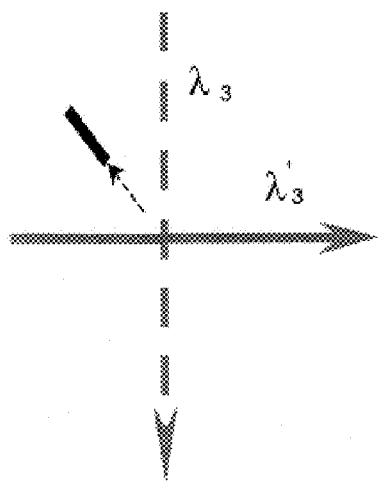
FIG. 12 is a diagram that illustrates an element out of path such that existing optical channel content of a light circuit can be uninterrupted and alternate channel content can continue on its path according to the embodiment illustrated in FIG. 10.

In FIG. 12, the diverting element 1000 is outside an optical path of a light circuit. The existing channel content operating at lambda three ($\Lambda_3$) is uninterrupted while alternative channel content operating at lambda three ($\Lambda'_3$) continues on its path through the optical path.

Figure 13:
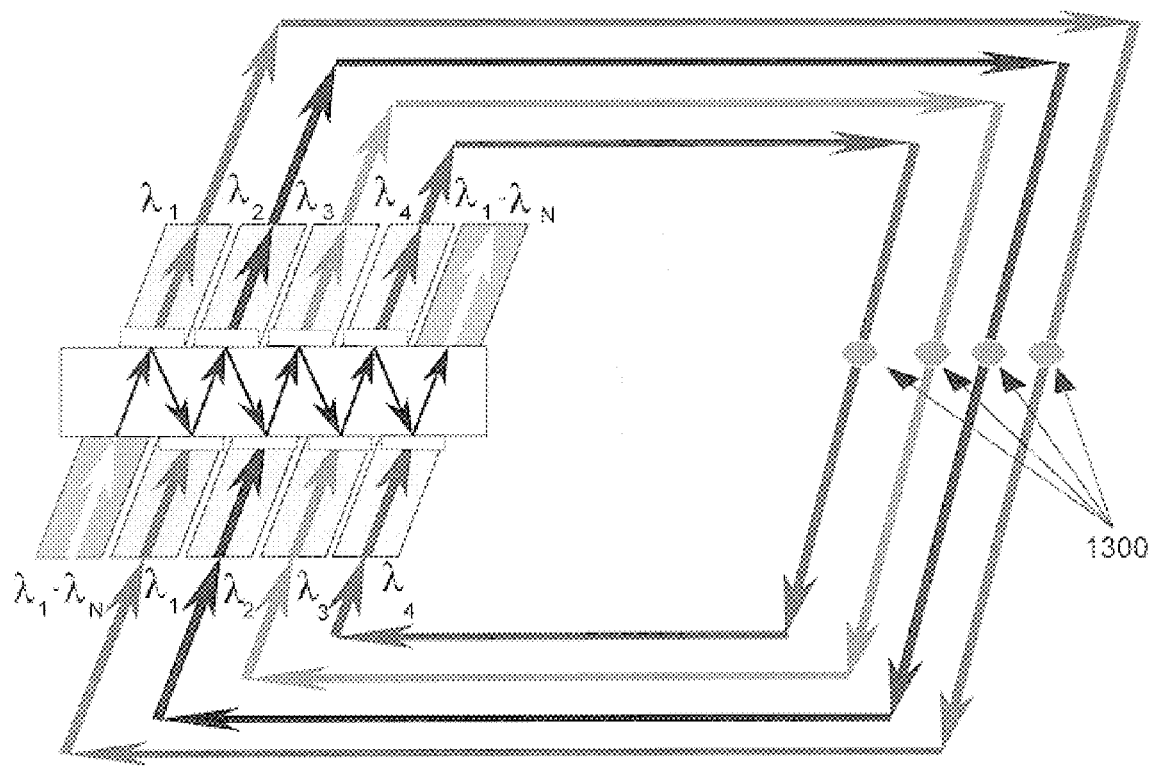
FIG. 13 is a diagram that illustrates an optical architecture for optical gain flattening and selective spectral amplification according to an alternate exemplary embodiment of the present invention.

FIG. 13 illustrates an optical architecture for optical gain flattening or spectral amplification. An optical network spectral window of operations can be defined, in a large part, by the spectral range of amplification. Since amplification gain can vary dramatically with wavelength, the extent of each channel's amplification can be defined by its spectral position. This phenomenon can be particularly programmatic for networks with multiple amplifiers, as the channel gain differential increases with multiple amplifications. In the assembly illustrated in FIG. 13, the channels operating at wavelengths lambda one ($\Lambda_1$) through lambda four ($\Lambda_4$) are attenuated discretely by gain flattening elements 1300 to flatten the gain of an extended spectral range. This approach can facilitate broadening of the spectral window of operation, heightening the channel count, and increasing a networks bandwidth.

The gain flattening elements 1300 can be represented as attenuators inserted into the light path. Appropriate attenuation can be applied to each channel to equalize the signal strength across the spectral range of channels. One gain flattening element can be an attenuating fiber where the length of the fiber is set as appropriate to realize desired signal strength reduction. This attenuating fiber can be produced by subjecting the fiber to prolonged, intense ultraviolet radiation such that it "browns." Similarly, absorbing material may be introduced into optical fiber materials. For example, the OH content of an optical fiber's silica can be controlled to set the spectral attenuation level. Another approach is to include the attenuation function within a waveguided filtering element. Another approach is to apply an attenuating coating onto the end-face surface of a waveguided filtering element underneath a filtering layer. A further approach is to include attenuation material within the zigzag-depicted optical path within the PLC 210E. Another approach is to position the channels with the highest power into locations with the lowest power transfer efficiency, thereby achieving an inherent reduction of power that accompanies beam divergence in the zigzag optical path of a PLC 210E.

The assembly illustrated in FIG. 13 supports a discrete-channel approach to signal amplification which is different from the common approach of collectively amplifying the channels. In the illustrated embodiment, the elements 1300 depicted can be amplifiers that apply selective gain to each spectral region. The spectral regions may contain one or numerous channels. For example, this amplification can be effective in transmitting and amplifying at both 1310 nanometers and 1550 nanometer spectral windows. The device architecture illustrated in FIG. 13 can provide multiple functions in a single integrated or modular unit.

Figure 14:
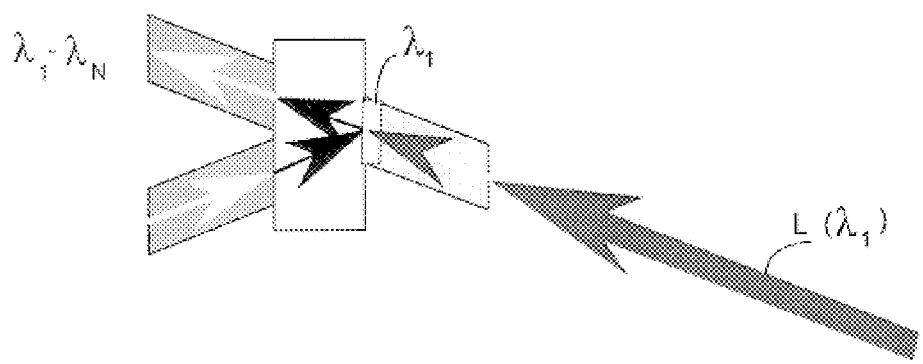
FIG. 14 illustrates a configuration to introduce pump light according to an alternate exemplary embodiment of the present invention.

FIG. 14 illustrates an add configuration that can be utilized to introduce pump laser light into an optical fiber or other waveguide such that in-the-waveguide amplification can be efficiently accomplished. In this embodiment, the optical filtering device operating at a wave length of lambda one ($\Lambda_1$) can efficiently pass the pump laser light operating at lambda one ($\Lambda_1$) into a pulse stream operating wavelength at lambda one ($\Lambda_1$) through lambda N ($\Lambda_N$).

Figure 15:
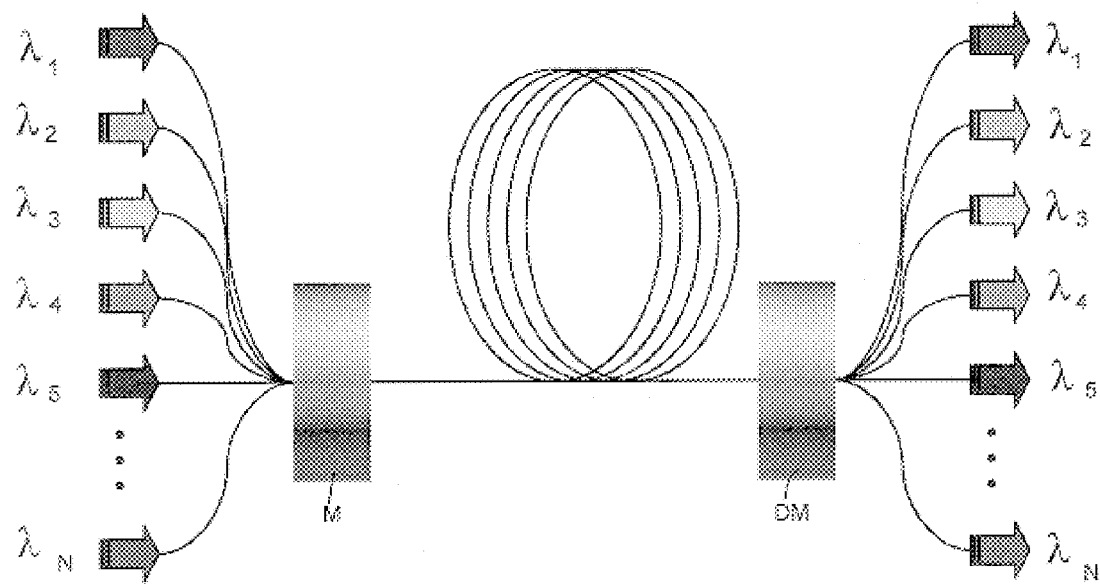
FIG. 15 is a diagram that illustrates a multiplex-demultiplex configuration according to an alternate exemplary embodiment of the present invention.

FIG. 15 illustrates another alternate exemplary embodiment of a multiplex-demultiplex configuration where optical energy having wavelengths lambda one ($\Lambda_1$) through lambda N ($\Lambda_N$) can be multiplexed at a multiplexer M and then demultiplexed at demultiplexer DM. The PLC 210, in combination with multiple optical filtering devices 220, can form the basis or the building blocks for the multiplexer M and the demultiplexer DM.

Figure 16:
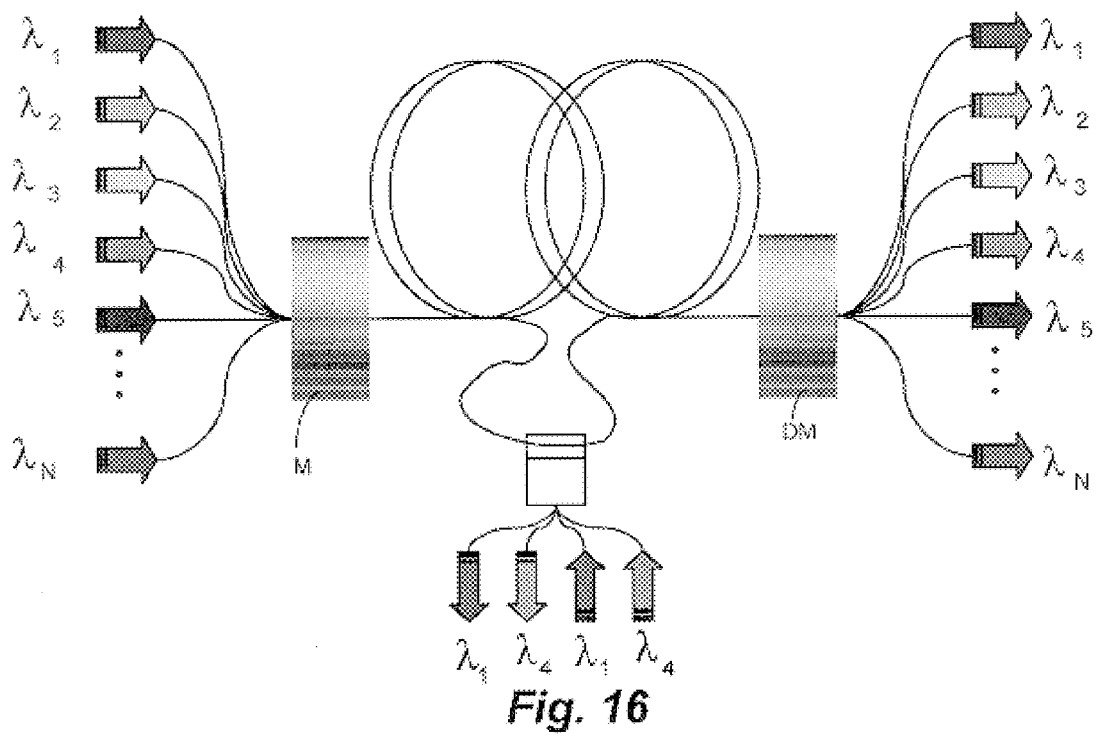
FIG. 16 is a diagram that illustrates an optical drop-add configuration for two networks according to an alternate exemplary embodiment of the present invention.

FIG. 16 illustrates an optical drop-add configuration where optical energy operating with wavelengths of lambda one ($\Lambda_1$) through lambda N ($\Lambda_N$) can be multiplexed at multiplexer M and demultiplexed at DM. However, in between the multiplexer M and demultiplexer DM, the channels lambda one ($\Lambda_1$) and lambda two ($\Lambda_2$) can be dropped and manipulated. Signal content along channels lambda one ($\Lambda_1$) and lambda four ($\Lambda_4$) can be modified or simply monitored (remaining the same) and then reinserted back into the optical path between the multiplexer and demultiplexer DM.

Figure 17:
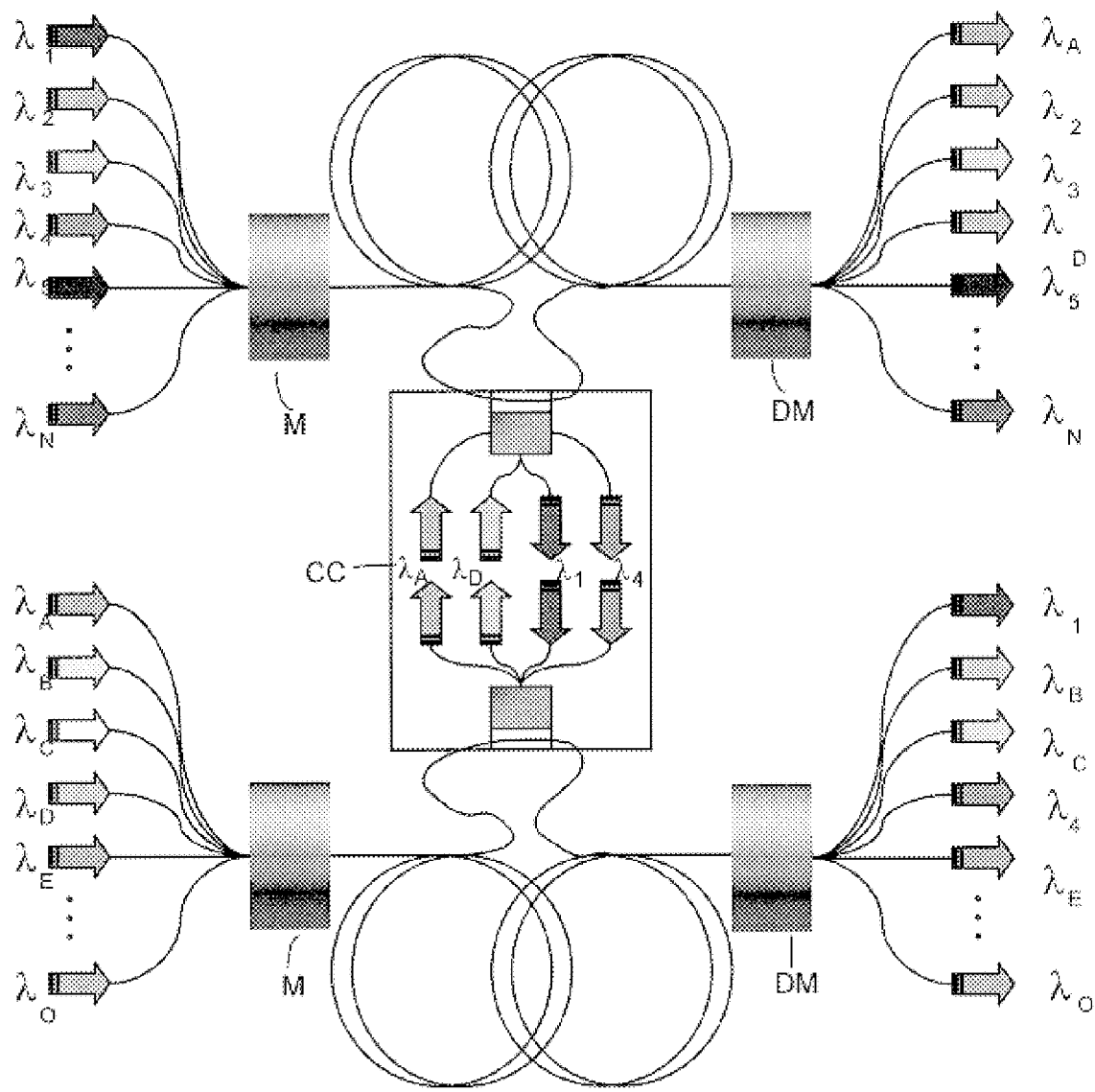
FIG. 17 is a diagram that illustrates an optical cross-connect configuration that permits communication between multiple networks according to an alternate exemplary embodiment of the present invention.

FIG. 17 illustrates an optical cross-connect configuration where two or more networks can exchange information relative to one another. For example, a first network operating with wavelengths lambda one ($\Lambda_1$) through lambda N ($\Lambda_N$) can exchange select channels of information with an optical network operating with wavelengths lambda A ($\Lambda_A$) through lambda zero ($\Lambda_O$). Wavelength lambda one ($\Lambda_1$) is substantially equal to wavelength lambda A ($\Lambda_A$) except that each may contain different information relative to the other. In other words, information content of wavelength lambda one ($\Lambda_1$) can be different relative to the information content of lambda A ($\Lambda_A$) but each wavelength can be substantially equal in magnitude. In this embodiment, channels lambda one ($\Lambda_1$) and lambda four ($\Lambda_4$) of the first network can be replaced with channels lambda A ($\Lambda_A$) and lambda D ($\Lambda_D$) of the second network and vice a versa. The cross-connect device CC can be implemented by variations of single-channel drop-add and cross-connect configurations, as discussed above.

Figure 18:
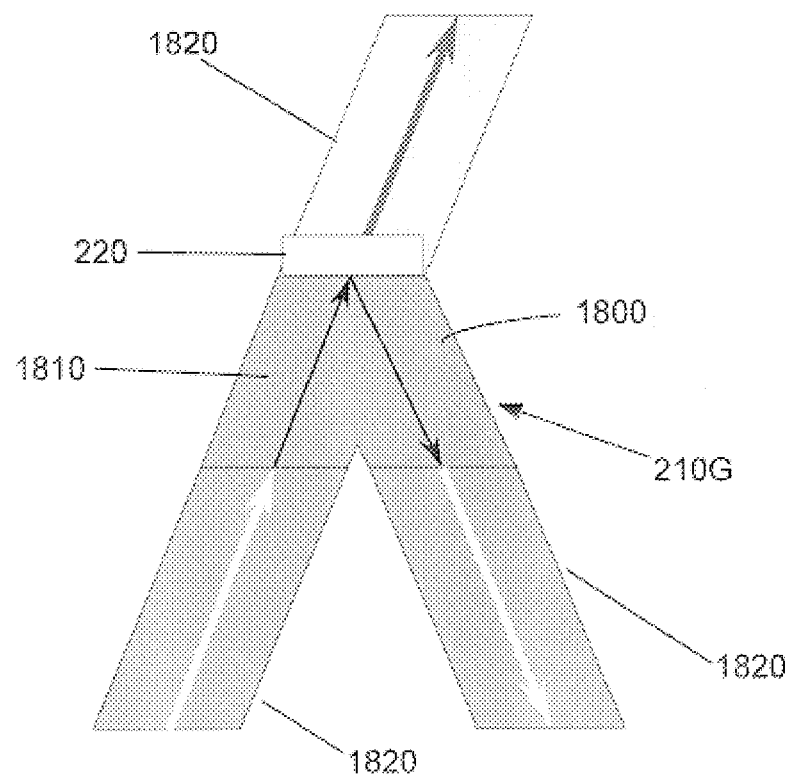
FIG. 18 is a diagram that illustrates a single-channel drop or add configuration that includes a shaped planar lightguide circuit according to an alternate exemplary embodiment of the present invention.

FIG. 18 illustrates an alternate exemplary embodiment of a single-channel drop or add where the PLC 210G can be made from a single segment of an optical material suitable for an input or output leg. In this embodiment, a sharp bend 1800 of an appropriate angle can be introduced into a segment 1810 such that the segment 1800 and input leg 1810 are formed as an integral unit. This may be accomplished by heating and bending, molding, or other methods of optical material manipulation. The filtering device can be attached to either the PLC 210G or an output leg 1820. Another method of fabrication can be to appropriately position each leg and then mold an optical polymer between the legs so as to form the PLC 210G. In this assembly, as well as in related configurations, uncontrolled light scattering within a light carrying structure can degrade performance. A method of minimizing this unwanted light in all these assemblies can include coating appropriate surfaces with an opaque and a light-absorbing coating. For example, the entire assembly can be encapsulated in a carbon or powdered metal-loaded epoxy.

Figure 19:
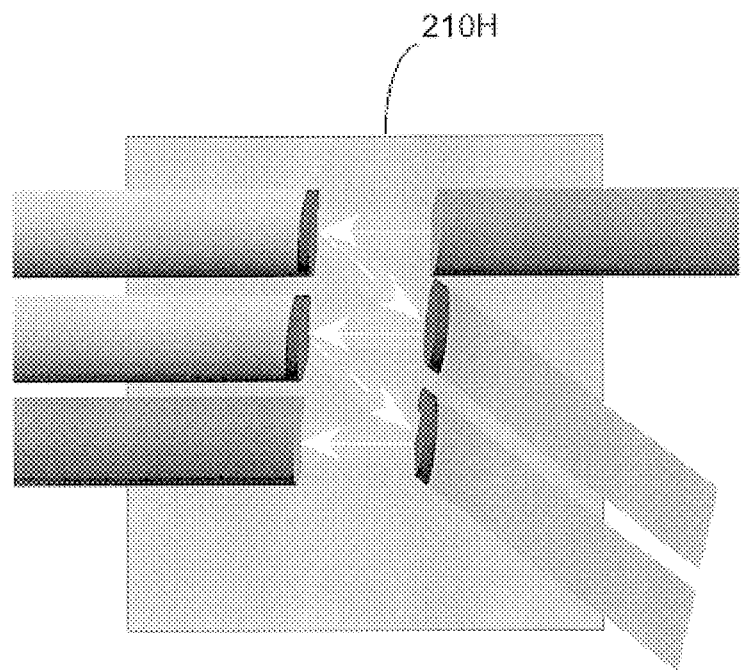
FIG. 19 is a diagram that illustrates a planar lightguide circuit integrated into a bulk matrix according to an alternative exemplary embodiment of the present invention.

FIG. 19 illustrates another alternate exemplary embodiment where the PLC 210H can be integrated into a bulk matrix. One method for forming this structure can be to utilize polymer molding techniques such as insert injection molding. Another method can be planar waveguide fabrication.

Figure 20:
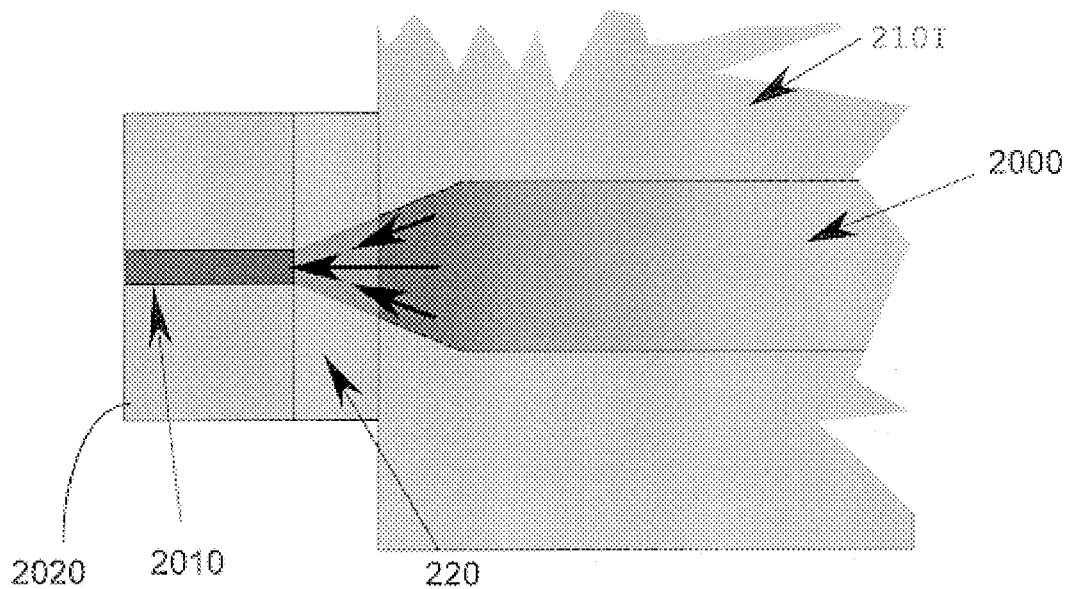
FIG. 20 is a diagram that illustrates a planar lightguide circuit with shaped optical paths according to an alternate exemplary embodiment of the present invention.

FIG. 20 illustrates another alternate exemplary embodiment where a PLC 2101 can have an optical path 2000 with a shape that is designed to collimate optical energy propagating there through. For single mode fibers operating in the near infrared region, the thickness of the optical filtering device 220 is significant relative to the fiber core size and outgoing light tends to diverge as it transmits through a filter stack of the optical filtering device. One method to address this situation is to shape the optical path 2000 on the opposite side of the optical filtering device 220 relative to the core 2010 of an optical fiber 2020. As the optical path 2000 transfers light to the optical fiber 220, the optical path can be tapered so that light is projected ultimately through the filter stack of the optical filtering device 220 and into the fiber core 2010. Alternatively (but not shown), the single mode fiber core 2010 can be shaped to collimate light energy propagating through the fiber 220 when the flow of the optical energy illustrated in FIG. 20 is reversed.

Figure 21:
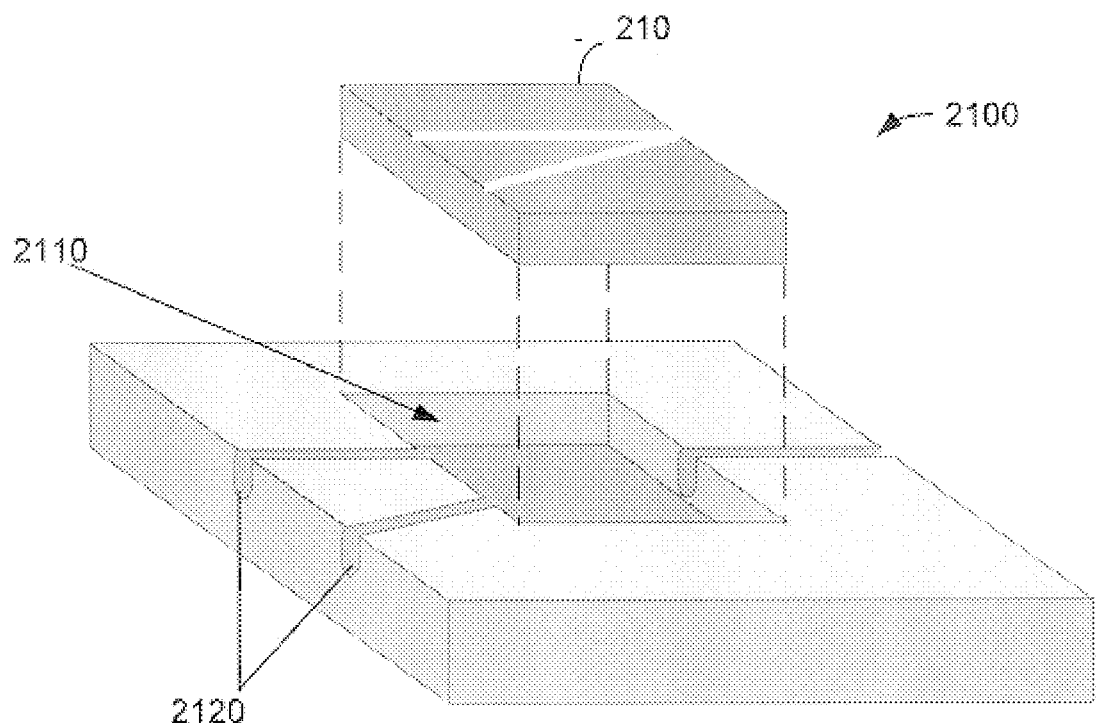
FIG. 21 is a diagram that illustrates a mounting structure for optical waveguides and a planar lightguide circuit.

FIG. 21 illustrates another alternate exemplary embodiment that includes a mounting structure 2100 for receiving the PLC 210. The mounting structure 2100 includes a cavity 2110 shaped similarly to the PLC 210. The mounting structure 2100 may further include fiber alignment and attachment channels 2120 that facilitate passive alignment of optical waveguides with the PLC 210. The positions of optical waveguides in PLCs can be precisely maintained relative to each other in order to promote efficient optical energy transferred and to prevent modal disruption. The mounting structure can be constructed from materials and methods known within the semiconductor fabrication arts. These techniques will not be described but are capable of generating high-precision structures.

The depth at which the PLC 210 is inserted into the cavity 2110 can be an important parameter as it can influence the efficiency of light transfer between the optical waveguides and the optical paths of the PLC 210. The positional accuracy can be built into the assembly. One or more shim slabs can be used to assist in positioning the optical waveguides in the PLC 210. The fiber alignment and attachment channels 2120 can be shaped to conform to symmetrical optical waveguides or, alternatively, V-grooves or rails can be employed. The diameters of the fiber alignment and attachment channels 2120 can be made slightly smaller than the diameter of an optical waveguide such that the optical waveguide can be held in place with the tension of the fiber alignment and attachment channels 2120. The PLC 210 and optical waveguides (not shown) can be fixed permanently to the mounting structure 2100 by encapsulating the entire assembly in an epoxy; a bonding agent, or similar material. Another method for forming the PLC 210 and optical waveguides to the mounting structure 2100 is to mold a polymer around the entire assembly.

Figure 22:
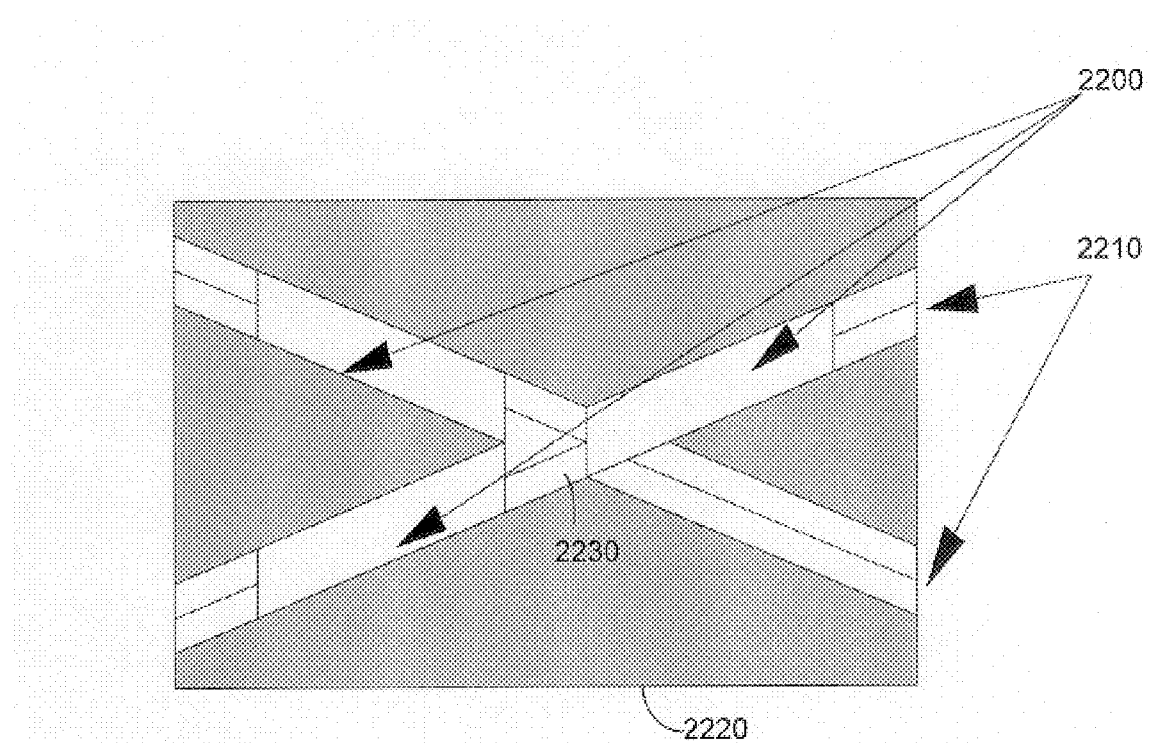
FIG. 22 is a diagram that illustrates a top view of a V-groove-based mounting structure according to an alternate exemplary embodiment of the present invention.

FIG. 22 illustrates another alternate exemplary embodiment that includes another mounting structure 2220. The mounting structure 2220, which can be configured for single-channel manipulation, includes V-grooves or similar channels 2210 that can align multiple optical waveguides 2200. The substrate material from which the channels 2210 of the mounting structure 2220 can be formed may include low-to-no expansion glass, ceramic, silica, aluminum, silicon, or other suitable materials. The grooves or channels can be cut at appropriate angles relative to one another. Materials and techniques known to the semi-conductor arts can be used to form the channels 2210.

A block of optical material may be inserted into a gap 2230 between optical waveguides 2200. This block (not shown) can assist in aligning the faces of the optical waveguides since only at the proper rotation will an element's face become co-planar with the block surface. Furthermore, the block (not shown) may have a high refractive index so as to minimize beam diverges during light cascade within a PLC. For example, in the infrared region of the optical spectrum, silicon has desirable characteristics. Cubic zirconium can be another high-refractive index material and can be used for outside of the transmission range of silicon. Optical polymers and epoxies can also be used. Low-to-no expansion glass such as that marketed under the trade name ZERODUR can be utilized to minimize thermal variation.

The mounting structure 2220 may also contain waveguide channels within its structure. The block (not shown) may also have a refractive index gradient so that light is steered within the gap. The block may also comprise properties such as birefringence in order to split and/or transmit light differently according to polarization. Since polarization dependency in filtering increases with the obliqueness of an incidence angle, this can facilitate compensating for interference filters spectral variation with the angle of incidence. Calcium fluoride is an example of a birefringent crystal.

The mounting structure 2220 can be permanently fixed by a number of devices. Epoxy can be used to fill the gap and/or encapsulate the mounting assembly 2220. Similarly, injection-molded optical polymers can be used. After the optical waveguides are positioned, they can be temporarily held in place. For example, a clamp may be used. Feeding test signals into the assembly and then micro-manipulating the positioning (including rotation of the optical waveguides until the signals are optimized) can be a way of achieving optimum alignment. However, robotic or other automated manipulation can be used for volume-based productions. After a position is selected and the clamps of the optical waveguides are set, an epoxy or polymer can be injected around or into the assembly to provide encapsulation in environmental isolation. Encapsulation can include hermetic techniques.

Figure 23:
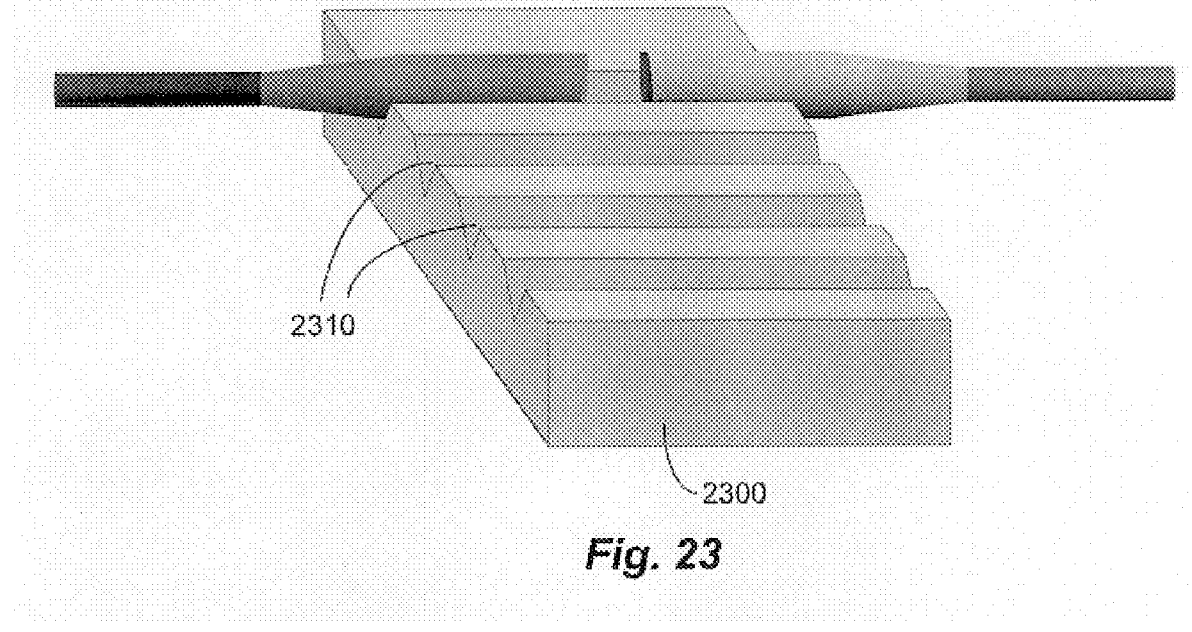
FIG. 23 is a diagram that illustrates a mounting structure for optical waveguides according to an alternate exemplary embodiment of the present invention.

FIG. 23 illustrates a mounting structure 2300 that includes V-grooves 2310. The V-grooves 2310 can facilitate efficient alignment between two optical waveguides or combination of optical waveguides and a PLC (not shown).

Figure 24:
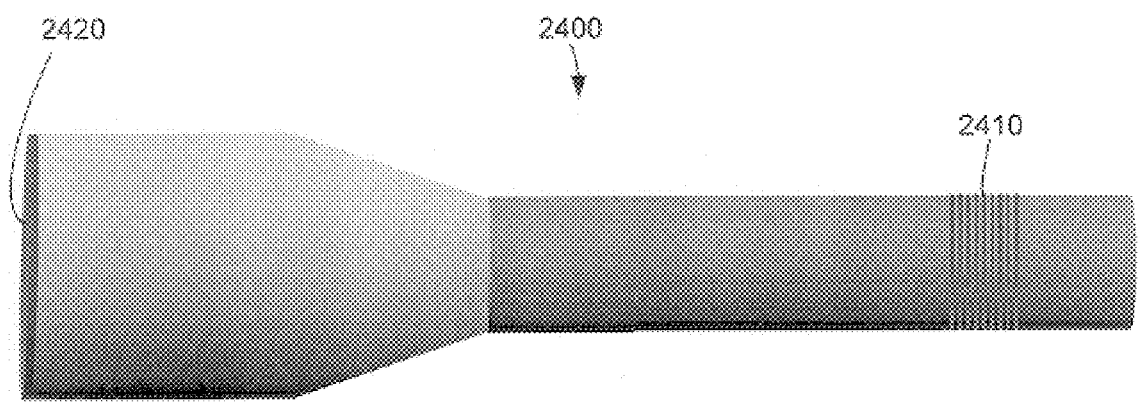
FIG. 24 is a diagram that illustrates a optical waveguide that includes a thin-film interference filter and a fiber Bragg grating according to an alternate exemplary embodiment of the present invention.

FIG. 24 illustrates an optical waveguide 2400 that can be used with PLC (not shown) and optical filtering devices (not shown). In this embodiment, a fiber Bragg grating can be written into the optical fiber such that light is filtered both by the grating and an interference filter 2420 disposed at an end of the optical waveguide 2400. The thin-film filter 2420 can operate over a broad spectral range and provides only a relatively coarse narrow spectral functionality. On the other hand, the fiber-Bragg grating 2410 can provide fine spectral resolution. Thus, the two filters can compliment one another. Thin-film interference filters, fiber Bragg gratings, and Mach-Zender-related interferometeric devices are three families of filtering technologies that can be important to optical networking. Thin-film interference filters can be the most flexible in terms of light manipulation and can have the best broad spectral performance. The latter two can be noteworthy for narrow band spectral performance.

A goal of a general assembly architecture can be to provide a platform through which multiple filtering technologies can be optimally combined. A related goal can be to provide ways to integrate multiple filters into an assembly in a series fashion. Note that light is precluded from resonating between the two filters 2420 and 2410 by orienting one of the filters at an angle relative to the path of light propagation. It is further noted that the magnitude of the obliqueness of an angle of a thin-film interference filter can be minimal because of the collimated aspect of the light at that point in the optical waveguide 2400. Tapered-based Mach-Zender technologies can be implemented but are not depicted in FIG. 24.

From the foregoing, it is apparent that the present invention has been described in relation to particular embodiments which are intended in all aspects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A cross-connect waveguide system comprising:
   a planar lightguide circuit having one or more optical paths;
   a plurality of optical waveguides coupled to said planar lightguide circuit;
   a plurality of filtering devices for feeding light energy into said optical paths of said planar lightguide circuit or receiving light energy from said optical paths of said planar lightguide circuit; and a diverting element for feeding first light energy at a predetermined wavelength having first information content away from said planar lightguide circuit, and for feeding second light energy at said predetermined wavelength having second information content into said planar lightguide circuit, wherein said diverting element is remotely configurable and is controlled with optically encoded information.

2. The cross-connect waveguide system of claim 1, wherein said diverting element comprises a double-sided mirror.

3. The cross-connect waveguide system of claim 1, wherein said diverting element is controlled by a dedicated control signal of light energy.

4. The cross-connect waveguide system of claim 1, wherein said diverting element is controlled by sampling the first light energy.

5. The cross-connect waveguide system of claim 1, wherein said diverting element is moveable between a first position and a second position.

6. The cross-connect waveguide system of claim 5, wherein said diverting element feeds said first light energy away from said planar lightguide circuit when said diverting element is in said first position, said diverting element feeds said second light energy into said planar lightguide circuit when said diverting element is in said first position, and said diverting element passes said first light energy into said planar lightguide circuit when said diverting element is in a second position.

7. The cross-connect waveguide system of claim 1, further comprising a monitor disposed within an optical path of said first light energy.

8. The cross-connect waveguide system of claim 7, wherein said monitor comprises a beam splitter.

9. The cross-connect waveguide system of claim 7, wherein said monitor samples active and dark power status of an optical waveguide.

10. The cross-connect waveguide system of claim 7, wherein said diverting element is remotely configurable.

11. The cross-connect waveguide system of claim 10, wherein said diverting element is controlled by sampling said first light energy with said monitor.

12. The cross-connect waveguide system of claim 1, wherein said diverting element connects two or more optical networks together.

13. The cross-connect waveguide system of claim 1, wherein said diverting element exchanges light energy of different wavelengths between one or more optical networks.

14. The cross-connect waveguide system of claim 1, wherein one or more of the filtering devices comprise dielectric, thin-film interference filters.

15. The cross-connect waveguide system of claim 1, wherein one or more of the filtering devices have a predetermined packing density in excess of ninety percent.

16. The cross-connect waveguide system of claim 15, wherein the packing density is above ninety-nine percent.

17. The cross-connect waveguide system of claim 1, wherein one or more of the filtering devices comprise rugate filters.

18. The cross-connect waveguide system of claim 1, wherein the one or more optical paths of said planar lightguide circuit comprise at least one of silica, plastic, BK-7, or a low expansion optical material.

19. The cross-connect waveguide system of claim 1, wherein the one or more optical paths of said planar lightguide circuit comprise circuit patterns made from at least one of etching and photolithographic techniques.

20. The cross-connect waveguide system of claim 1, wherein said planar lightguide circuit comprises at least one of a high index film or substrate with a dopant diffused therein.

21. The cross-connect waveguide system of claim 1, wherein the one or more filtering devices operate in at least one of a 1310 nanometer wavelength region and a 1550 nanometer region.

22. The cross-connect waveguide system of claim 1, wherein the one or more filtering devices differentiate between light channels spaced less than two nanometers apart.

23. The cross-connect waveguide system of claim 1, wherein the one or more filtering devices have transmission levels greater than ninety percent at a first wavelength and block at least 25 decibels down at adjacent channels spaced 1.8 nanometers away from said first channel.

24. The cross-connect waveguide system of claim 23, wherein the one or more filtering devices comprise a tunable filter.

25. The cross-connect waveguide system of claim 1, wherein the one or more filtering devices block at least 35 decibels for non-adjacent channels.

26. A method for adding and dropping light energy with multiple information contents comprising the steps of:

feeding multiplexed light energy into a planar lightguide circuit;

demultiplexing the light energy by dropping first light energy at a predetermined wavelength having first information content from said planar lightguide circuit;

generating control signals by encoding control information within an optical signal to activate a diverting element to feed the first light energy away from said planar lightguide circuit while feeding second light energy at said predetermined wavelength having second information content into said planar lightguide circuit for multiplexing with light energy in said planar lightguide circuit; and generating control signals by encoding control information within an optical signal to de-activate said diverting element to feed the first light energy into said planar lightguide circuit for multiplexing with light energy in said planar lightguide circuit.

27. The method of claim 26, wherein the steps of generating control signals further comprise the step of encoding control information within a dedicated control signal of light energy.

28. The method of claim 26, wherein the step of generating control signals to activate a diverting element further comprises the step of positioning a double-sided mirror within an optical path of said first light energy.

29. The method of claim 26, further comprising the step of monitoring the first information content of said first light energy.

30. The method of claim 26, further comprising the steps of:

sampling the first information content of said first light energy, and in response to sampling the first information content, generating said control signals for said diverting element.

31. A cross-connect waveguide system comprising:

a planar lightguide circuit having one or more optical paths;

a plurality of optical waveguides coupled to said planar lightguide circuit;

a plurality of filtering devices for feeding light energy into said optical paths of said planar lightguide circuit or receiving light energy from said optical paths of said planar lightguide circuit; and a diverting element for feeding first light energy at a predetermined wavelength having first information content away from said planar lightguide circuit, and for feeding second light energy at said predetermined wavelength having second information content into said planar lightguide circuit, wherein said diverting element is remotely configurable and is controlled by address headers of light energy containing configuration instructions.

32. The cross-connect waveguide system of claim 31, wherein said diverting element is controlled by a dedicated control signal of light energy.

33. The cross-connect waveguide system of claim 31, wherein said diverting element is controlled by sampling the first light energy.

34. The cross-connect waveguide system of claim 31, wherein said diverting element comprises a double-sided mirror.

* * * * *